United States Patent
Li et al.

(10) Patent No.: US 11,497,047 B2
(45) Date of Patent: Nov. 8, 2022

(54) USER EQUIPMENT-SPECIFIC SCHEDULING REQUEST REPETITIONS

(71) Applicant: QUALCOMM Incorporated, San Diego, CA (US)

(72) Inventors: Chong Li, Weehawken, NJ (US); Wanshi Chen, San Diego, CA (US); Jing Jiang, San Diego, CA (US); Jing Sun, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 182 days.

(21) Appl. No.: 16/137,840

(22) Filed: Sep. 21, 2018

(65) Prior Publication Data
US 2019/0098654 A1    Mar. 28, 2019

Related U.S. Application Data

(60) Provisional application No. 62/563,011, filed on Sep. 25, 2017.

(51) Int. Cl.
*H04W 72/12* (2009.01)
*H04B 17/309* (2015.01)
(Continued)

(52) U.S. Cl.
CPC ...... *H04W 72/1284* (2013.01); *H04B 17/309* (2015.01); *H04L 1/189* (2013.01);
(Continued)

(58) Field of Classification Search
None
See application file for complete search history.

(56) References Cited

U.S. PATENT DOCUMENTS

| 2012/0033628 A1* | 2/2012 | Eriksson ........... H04W 72/1284 370/329 |
| 2013/0163534 A1 | 6/2013 | Anderson et al. |

(Continued)

FOREIGN PATENT DOCUMENTS

| EP | 2485556 A1 | 8/2012 |
| WO | WO2016161791 A1 | 10/2016 |
| WO | WO2017179814 A1 | 10/2017 |

OTHER PUBLICATIONS

Intel Corporation: "Enhancements to SR Targeting Low Latency Requirements",3GPP Draft, R1-1707406, INTEL SR URLLC, 3rd Generation Partnership Project (3GPP), Mobile Competence Centre, 650, Route Des Lucioles, F-06921 Sophia-Antipolis Cedex, France, vol. RAN WG1, No. Hangzhou; May 15, 2017-May 19, 2017, May 14, 2017 (May 14, 2017), XP051272616, pp. 1-5, Retrieved from the Internet:URL:http://www.3gpp.org/ftp/Meetings_3GPP_SYNC/RAN1/Docs/ [ retrieved on May 14, 2017].

(Continued)

*Primary Examiner* — James P Duffy
(74) *Attorney, Agent, or Firm* — Terry Tsai

(57) ABSTRACT

Methods, systems, and devices for wireless communications are described. A base station and a user equipment (UE) may communicate in a high reliability and low latency communications system (e.g., ultra-reliable low latency communications (URLLC)). The base station may signal a UE-specific scheduling request (SR) repetition configuration that the UE may utilize to transmit an instantaneous SR when a buffer status report (BSR) is triggered by a new data packet. The UE may repeatedly transmit the SR until a number of repetitions or a time period of repetitions is met or an uplink grant is received from the base station. The SR repetition configuration may include a number of parameters including a repetition setting, power settings, a resource (Continued)

allocation, and an acknowledgement/negative acknowledgment (ACK/NACK) procedure.

55 Claims, 18 Drawing Sheets

(51) Int. Cl.
    *H04L 5/00*         (2006.01)
    *H04L 1/18*         (2006.01)
    *H04W 52/48*       (2009.01)
    *H04W 72/04*       (2009.01)

(52) U.S. Cl.
    CPC .......... *H04L 5/0051* (2013.01); *H04L 5/0053* (2013.01); *H04L 5/0055* (2013.01); *H04L 5/0091* (2013.01); *H04W 52/48* (2013.01); *H04W 72/1247* (2013.01); *H04W 72/0413* (2013.01)

(56) References Cited

U.S. PATENT DOCUMENTS

| | | | |
|---|---|---|---|
| 2013/0250828 A1 | 9/2013 | Chou et al. | |
| 2015/0043420 A1* | 2/2015 | Xiong | H04W 56/00 370/315 |
| 2015/0078224 A1* | 3/2015 | Xiong | H04L 5/0055 370/280 |
| 2016/0227560 A1* | 8/2016 | Webb | H04W 72/1242 |
| 2017/0142749 A1 | 5/2017 | Kim et al. | |
| 2017/0347369 A1 | 11/2017 | Lee et al. | |
| 2018/0139764 A1 | 5/2018 | Hwang et al. | |
| 2018/0160443 A1* | 6/2018 | Tang | H04W 72/12 |
| 2019/0223190 A1* | 7/2019 | Hwang | H04L 1/08 |

OTHER PUBLICATIONS

International Search Report and Written Opinion—PCT/US2018/052451—ISA/EPO—dated Dec. 3, 2018.
Taiwan Search Report—TW107133600—TIPO—dated Feb. 21, 2022.

* cited by examiner

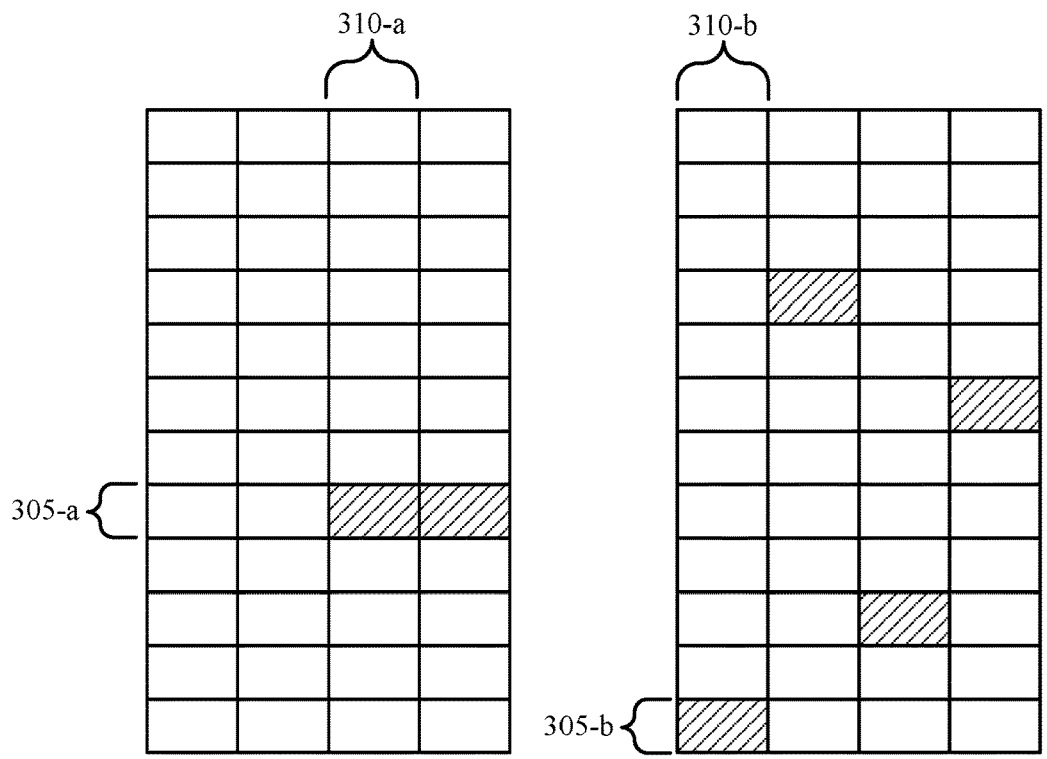
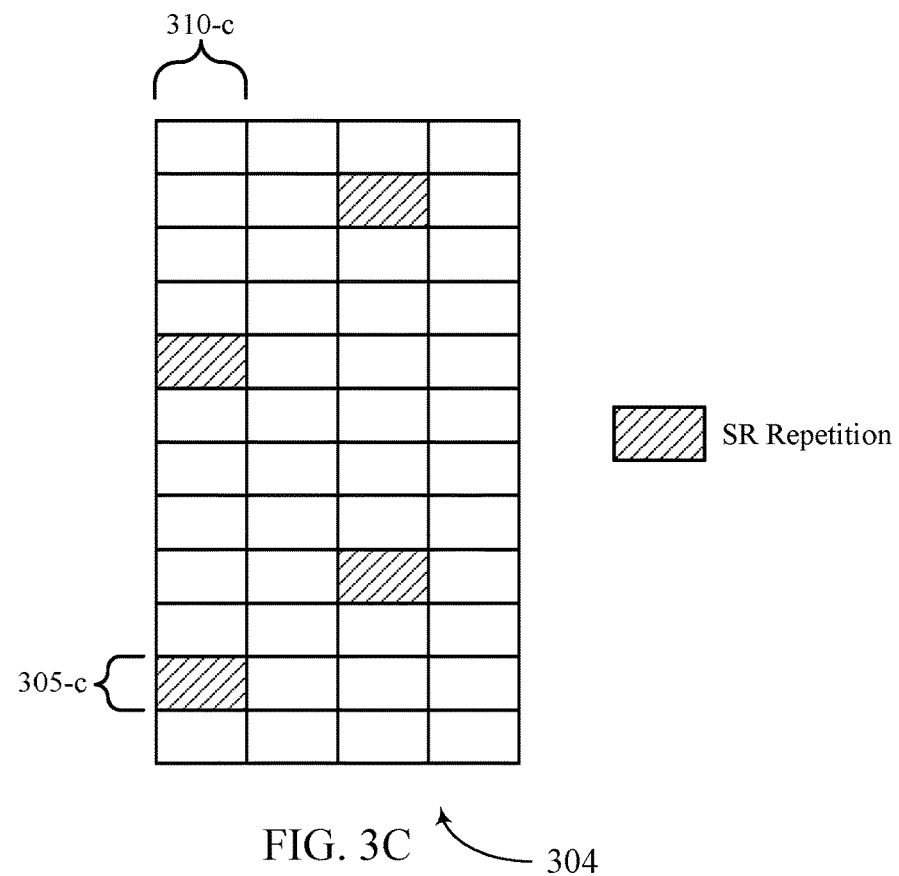
FIG. 3A
FIG. 3B
FIG. 3C

USER EQUIPMENT-SPECIFIC SCHEDULING REQUEST REPETITIONS

CROSS REFERENCES

The present Application for Patent claims the benefit of U.S. Provisional Patent Application No. 62/563,011 by Li, et al., entitled "User Equipment-Specific Scheduling Request Repetitions," filed Sep. 25, 2017, assigned to the assignee hereof, and expressly incorporated herein.

BACKGROUND

The following relates generally to wireless communication, and more specifically to user equipment (UE)-specific scheduling request (SR) repetitions (e.g., retransmissions).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UE.

In some wireless communications systems, a UE may transmit an SR to a base station to request resources for an uplink transmission. The SR may be triggered when data becomes available for transmission. In some cases, the UE may wait to transmit the SR at periodic starting times designated by the base station for SR transmissions. However, in wireless communications systems with high reliability and low latency requirements (e.g., ultra-reliable low latency communications (URLLC)), more efficient techniques for transmitting an SR more frequently may be desired.

SUMMARY

The described techniques relate to improved methods, systems, devices, or apparatuses that support user equipment (UE)-specific scheduling request (SR) repetitions (e.g., retransmissions). Generally, the described techniques provide for an SR repetition configuration that enables the transmission of an instantaneous SR such that latency is reduced and reliability is improved. For example, the SR repetition configuration may include an SR repetition number, an SR repetition periodicity, a starting symbol period to transmit a repetition of an SR, a power configuration to transmit a repetition of an SR, a configuration of an SR resource allocation to transmit a repetition of an SR, or a combination thereof. In some cases, an SR repetition parameter may be generated to signify the SR repetition configuration. For example, the SR repetition parameter may be indicative of the different parameters of the SR repetition configuration. Additionally or alternatively, the SR repetition parameter may include an index of the SR repetition configuration. In some cases, the SR repetition configuration and parameter may be specific to a UE. For example, the SR repetition configuration and parameter may be based on a traffic priority for the UE, a UE link budget, a latency requirement of the UE, a reliability requirement of the UE, historical SR performance of the UE, a location of the UE, or any combination thereof.

A base station may determine the UE-specific SR repetition configuration, generate the SR repetition parameter based on the SR repetition configuration, and transmit the SR repetition parameter to a UE. In some cases, the UE may transmit the repetition of an SR as part of ultra-reliable low latency communications (URLLC). In some cases, the UE may transmit the SR during an SR response window until a maximum number of SR repetitions is satisfied as indicated by the SR repetition parameter. Additionally or alternatively, the UE may transmit the SR during an SR response window until a resource grant is received from the base station.

A method of wireless communication is described. The method may include receiving, from a base station, a message comprising a SR repetition parameter for the UE and transmitting a repetition of an SR to the base station based on the received SR repetition parameter. The SR repetition parameter may be UE-specific and based at least in part on one or more of traffic priority for the UE, a UE link budget, a traffic latency requirement, or historical SR performance.

An apparatus for wireless communication is described. The apparatus may include means for receiving, from a base station, a message comprising a SR repetition parameter for the UE and means for transmitting a repetition of an SR to the base station based on the received SR repetition parameter. The SR repetition parameter may be UE-specific and based at least in part on one or more of traffic priority for the UE, a UE link budget, a traffic latency requirement, or historical SR performance.

Another apparatus for wireless communication is described. The apparatus may include a processor, memory in electronic communication with the processor, and instructions stored in the memory. The instructions may be operable to cause the processor to receive, from a base station, a message comprising a SR repetition parameter for the UE and transmit a repetition of an SR to the base station based on the received SR repetition parameter. The SR repetition parameter may be UE-specific and based at least in part on one or more of traffic priority for the UE, a UE link budget, a traffic latency requirement, or historical SR performance.

A non-transitory computer readable medium for wireless communication is described. The non-transitory computer-readable medium may include instructions operable to cause a processor to receive, from a base station, a message comprising a SR repetition parameter for the UE and transmit a repetition of an SR to the base station based on the received SR repetition parameter. The SR repetition parameter may be UE-specific and based at least in part on one or more of traffic priority for the UE, a UE link budget, a traffic latency requirement, or historical SR performance.

In some examples of the method, apparatus, and non-transitory computer-readable medium described above, the SR repetition parameter may be indicative of an SR repetition number indicating a maximum number of SR repetitions.

In some examples of the method, apparatus, and non-transitory computer-readable medium described above, the SR repetition parameter may be indicative of an SR repetition periodicity.

In some examples of the method, apparatus, and non-transitory computer-readable medium described above, the SR repetition parameter may be indicative of a starting symbol period to begin transmitting the repetition of the SR, the starting symbol period being based on an SR repetition number and an SR repetition periodicity, where the repetition of the SR may be transmitted using the starting symbol period.

In some examples of the method, apparatus, and non-transitory computer-readable medium described above, the SR repetition parameter includes an index of an SR repetition configuration for the UE.

Some examples of the method, apparatus, and non-transitory computer-readable medium described above may further include processes, features, means, or instructions for adjusting a transmission power for transmitting the repetition of the SR based on the power configuration.

In some examples of the method, apparatus, and non-transitory computer-readable medium described above, adjusting the transmission power for transmitting the repetition of the SR includes increasing the transmission power for the repetition of the SR in symbol periods known by the UE to may have a channel condition that satisfies a threshold.

In some examples of the method, apparatus, and non-transitory computer-readable medium described above, the SR repetition parameter may be indicative of the transmission power for transmitting the repetition of the SR based on an SR repetition number.

In some examples of the method, apparatus, and non-transitory computer-readable medium described above, the SR repetition parameter may be indicative of an SR resource allocation, where the repetition of the SR may be transmitted on a set of time-frequency resources in accordance with the SR resource allocation.

In some examples of the method, apparatus, and non-transitory computer-readable medium described above, the SR resource allocation may be indicative of transmitting the repetition of the SR using a hopping pattern, or a same symbol period, or multiple symbol periods, or cyclic shifts in a single resource block, different radio frequency bands, or any combination thereof.

In some examples of the method, apparatus, and non-transitory computer-readable medium described above, transmitting the repetition of the SR includes transmitting the SR during an SR response window until a maximum number of SR repetitions may be satisfied.

In some examples of the method, apparatus, and non-transitory computer-readable medium described above, transmitting the repetition of the SR includes transmitting the SR during an SR response window until a resource grant may be received from the base station.

In some examples of the method, apparatus, and non-transitory computer-readable medium described above, transmitting the repetition of the SR includes transmitting the repetition of the SR in multiple slots or subframes.

Some examples of the method, apparatus, and non-transitory computer-readable medium described above may further include processes, features, means, or instructions for identifying a collision between a transmission of a feedback message and the repetition of the SR. Some examples of the method, apparatus, and non-transitory computer-readable medium described above may further include processes, features, means, or instructions for determining a priority of the feedback message and a priority of the repetition of the SR. Some examples of the method, apparatus, and non-transitory computer-readable medium described above may further include processes, features, means, or instructions for transmitting the feedback message, or the repetition of the SR, or both, based on the priority of the feedback message and the priority of the repetition of the SR.

In some examples of the method, apparatus, and non-transitory computer-readable medium described above, the message includes a radio resource control (RRC) message or via a physical downlink control channel (PDCCH).

In some examples of the method, apparatus, and non-transitory computer-readable medium described above, the repetition of the SR may be transmitted as part of URLLC.

A method of wireless communication is described. The method may include identifying channel conditions associated with a UE, determining a SR repetition configuration for the UE based on the channel conditions, generating an SR repetition parameter for the UE based on the SR repetition configuration, and transmitting the SR repetition parameter to the UE. The SR repetition configuration may be UE-specific and also based at least in part on one or more of traffic priority for the UE, a UE link budget, a traffic latency requirement, or historical SR performance.

An apparatus for wireless communication is described. The apparatus may include means for identifying channel conditions associated with a UE, means for determining a SR repetition configuration for the UE based on the channel conditions, means for generating an SR repetition parameter for the UE based on the SR repetition configuration, and means for transmitting the SR repetition parameter to the UE. The SR repetition configuration may be UE-specific and also based at least in part on one or more of traffic priority for the UE, a UE link budget, a traffic latency requirement, or historical SR performance.

Another apparatus for wireless communication is described. The apparatus may include a processor, memory in electronic communication with the processor, and instructions stored in the memory. The instructions may be operable to cause the processor to identify channel conditions associated with a UE, determine a SR repetition configuration for the UE based on the channel conditions, generate an SR repetition parameter for the UE based on the SR repetition configuration, and transmit the SR repetition parameter to the UE. The SR repetition configuration may be UE-specific and also based at least in part on one or more of traffic priority for the UE, a UE link budget, a traffic latency requirement, or historical SR performance.

A non-transitory computer readable medium for wireless communication is described. The non-transitory computer-readable medium may include instructions operable to cause a processor to identify channel conditions associated with a UE, determine a SR repetition configuration for the UE based on the channel conditions, generate an SR repetition parameter for the UE based on the SR repetition configuration, and transmit the SR repetition parameter to the UE. The SR repetition configuration may be UE-specific and also based at least in part on one or more of traffic priority for the UE, a UE link budget, a traffic latency requirement, or historical SR performance.

Some examples of the method, apparatus, and non-transitory computer-readable medium described above may further include processes, features, means, or instructions for determining an SR repetition number indicating a maximum number of SR repetitions by the UE, where the SR repetition parameter may be indicative of the SR repetition number.

Some examples of the method, apparatus, and non-transitory computer-readable medium described above may further include processes, features, means, or instructions for determining an SR repetition periodicity for the UE to transmit a repetition of an SR, where the SR repetition parameter may be indicative of the SR repetition periodicity.

Some examples of the method, apparatus, and non-transitory computer-readable medium described above may further include processes, features, means, or instructions for determining a starting symbol period for the UE to transmit a repetition of an SR, the starting symbol period being based on an SR repetition number and an SR repetition periodicity, where the SR repetition parameter may be indicative of the starting symbol period.

In some examples of the method, apparatus, and non-transitory computer-readable medium described above, the SR repetition parameter includes an index of the SR repetition configuration.

Some examples of the method, apparatus, and non-transitory computer-readable medium described above may further include processes, features, means, or instructions for determining a power configuration for the UE to transmit a repetition of an SR, the power configuration being based on the channel conditions, where the SR repetition parameter may be indicative of the power configuration.

In some examples of the method, apparatus, and non-transitory computer-readable medium described above, the power configuration includes an indication of the transmission power for transmitting the repetition of the SR based on an SR repetition number.

Some examples of the method, apparatus, and non-transitory computer-readable medium described above may further include processes, features, means, or instructions for configuring an SR resource allocation for the UE to transmit a repetition of an SR, where the SR repetition parameter may be indicative of the SR resource allocation.

In some examples of the method, apparatus, and non-transitory computer-readable medium described above, the SR resource allocation indicates a set of time-frequency resources for the repetition of the SR using a hopping pattern, or a same symbol period, or multiple symbol periods, or cyclic shifts in a single resource block, different radio frequency bands, or any combination thereof.

Some examples of the method, apparatus, and non-transitory computer-readable medium described above may further include processes, features, means, or instructions for receiving, from the UE, repetitions of an SR during an SR response window in accordance with the SR repetition configuration. Some examples of the method, apparatus, and non-transitory computer-readable medium described above may further include processes, features, means, or instructions for decoding the SR based on a combination of the received repetitions of the SR.

In some examples of the method, apparatus, and non-transitory computer-readable medium described above, the SR repetition configuration also may be based on reliability requirement of the UE, or a location of the UE, or any combination thereof.

In some examples of the method, apparatus, and non-transitory computer-readable medium described above, the SR repetition parameter may be transmitted via RRC messaging or via a PDCCH.

BRIEF DESCRIPTION OF THE DRAWINGS

FIGS. 3A, 3B, and 3C illustrate examples of SR repetition resource allocation configurations that support UE-specific SR repetitions (e.g., retransmissions) in accordance with aspects of the present disclosure.

DETAILED DESCRIPTION

Figure 1:
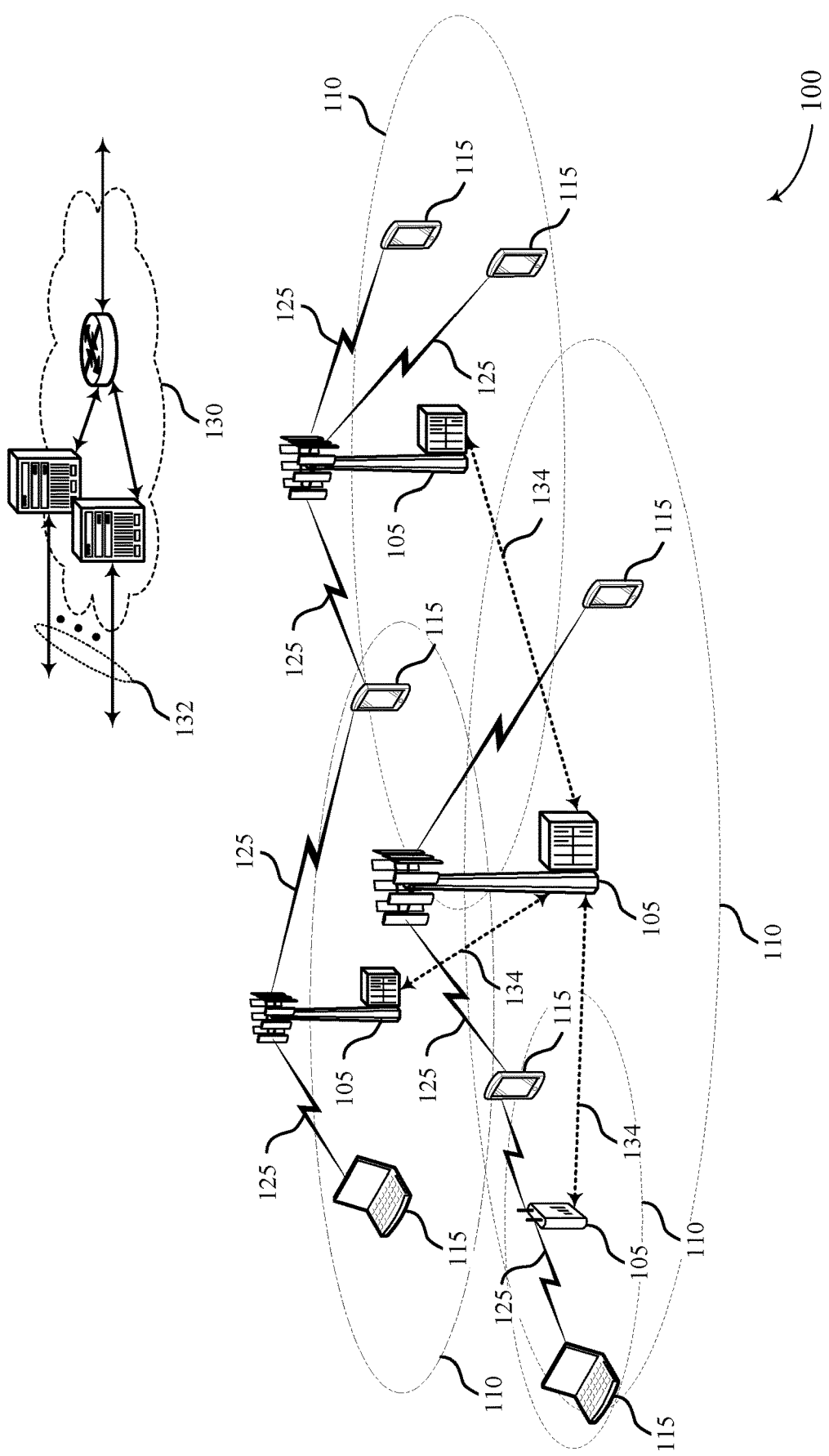
FIG. 1 illustrates an example of a system for wireless communication that supports user equipment (UE)-specific scheduling request (SR) repetitions (e.g., retransmissions) in accordance with aspects of the present disclosure.

A user equipment (UE) may transmit a scheduling request (SR) message to a base station requesting resources for an uplink transmission. The SR may be in response to an event at the UE (e.g., a change in buffer status report (BSR) or uplink data arrival from a logical channel group). In some examples, the SR may convey the request for resources using one or multiple bits. Once the SR is transmitted and received by the base station, the base station may transmit an uplink grant (e.g., downlink control information (DCI)), and the UE may transmit a message in a physical uplink shared channel (PUSCH) in response to the uplink grant. In some cases, the base station may signal an SR configuration via radio resource control (RRC) messaging to the UE for transmitting SRs. The configuration may include a starting point that indicates a periodic starting time at which the UE may transmit an SR. Additionally, the configuration may include an SR response window where the UE waits for a response (e.g., an uplink grant) from the base station. If the UE does not receive a response within the window, it may retransmit the SR.

In some cases, the base station and UE may operate in a communications system requiring high reliability and low latency transmissions between devices (e.g., ultra-reliable low latency communications (URLLC)). In such communications systems, the UE may transmit an instantaneous SR when a BSR is triggered by a new data packet instead of waiting for a periodic starting time for transmitting SRs. Additionally, as described herein, the base station may signal a UE-specific SR repetition configuration that the UE may utilize in order to decrease the chances of a missed detection of the SR by the base station and eliminate the need to wait until the end of a response window to retransmit the SR. The UE may repeatedly transmit the SR until a number of repetitions or a time period of repetitions is met or an uplink grant is received from the base station. The base station may determine the UE-specific SR repetition configuration based on UE-specific conditions, such as traffic priority, UE link budget, latency requirements, historical requirements, etc. In some cases, the base station may choose the UE-specific SR configuration from a table of available SR configurations and signal an index corresponding to the chosen UE-specific SR configuration to the UE. The base station may transmit the UE-specific SR configuration in a semi-persistent signaling (e.g., RRC messaging) or in a dynamic signaling (e.g., physical downlink control channel (PDCCH)).

The SR repetition configuration may include a number of parameters including a repetition setting, power settings, a resource allocation, and an acknowledgement/negative acknowledgment (ACK/NACK) procedure. The repetition setting parameter may include a number of repetitions for the SR, a time period for the repetitions, a starting point for the repetitions, or a combination thereof. The power settings may include power boosts to certain repetitions of the SR based on channel conditions or based on latency requirements. The resource allocation parameter may include on which resources in a time-frequency domain to transmit the SR repetitions. The ACK/NACK procedure parameter may include an indication of how the UE should respond when there is a need to transmit an ACK/NACK feedback in the same symbol as an SR.

Aspects of the disclosure are initially described in the context of wireless communications systems. Examples of an SR repetition configuration and a process flow are then described. Aspects of the disclosure are further illustrated by and described with reference to apparatus diagrams, system diagrams, and flowcharts that relate to UE-specific scheduling request repetitions (e.g., retransmissions).

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices (e.g., URLLC).

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may provide low latency services with high reliability as may be desired in certain applications (e.g., remote control, wireless automation of production facilities, vehicular traffic efficiency and safety, mobile gaming, etc.). URLLC is an example of a low latency service with high reliability. In such wireless communications, a base station 105 may transmit URLLC data to a UE 115, and the UE 115 may need to immediately transmit ACK/NACK feedback.

In some cases, UE 115 may transmit an SR message to a base station 105 requesting resources for an uplink transmission. The MAC of the UE 115 may trigger the SR in response to an event at the UE 115 (e.g., a change in BSR or uplink data arrival from a logical channel group). Once the SR is transmitted and received by the base station 105, the base station 105 may transmit an uplink grant (e.g., in DCI 0 format), and the UE 115 may transmit a message in a PUSCH in response to the uplink grant. In some cases, the base station 105 may signal an SR configuration via RRC messaging to the UE 115 for transmitting SRs. The configuration may include a starting point that indicates a periodic starting time at which the UE 115 may transmit an SR. Additionally, the configuration may include an SR response window where the UE 115 waits for a response (e.g., an uplink grant) from the base station 105. If the UE 115 does not receive a response within the window, it may retransmit the SR. The timing among the SR, uplink grant, and PUSCH transmission may vary according to the transmission scheme (e.g., FDD, TDD, etc.). In some cases, waiting for the starting period to transmit the SR or waiting to retransmit the SR after the response window time expires may increase the latency of the SR transmission.

Wireless communications system 100 may support efficient techniques for configuring and utilizing an SR repetition scheme. A base station 105 and UE 115 may communicate in a high reliability (e.g., less than 0.001% block error rate) and low latency (e.g., less than 2 ms) communications system (e.g., URLLC). In such communications systems, the UE 115 may transmit an instantaneous SR when a BSR is triggered by a new data packet instead of waiting for a periodic starting time for transmitting SRs. Additionally, as described herein, the base station 105 may signal a UE-specific SR repetition configuration that the UE 115 may utilize in order to decrease the chances of a missed detection of the SR by the base station 105 and eliminate the need to wait until the end of a response window to retransmit the SR. The UE 115 may repeatedly transmit the SR until a number of repetitions or a time period of repetitions is met or an uplink grant is received from the base station 105. The base station 105 may determine the UE-specific SR repetition configuration based on UE-specific conditions for the UE 115, such as traffic priority, UE link budget, latency requirements, historical requirements, etc. In some cases, the base station 105 may choose the UE-specific SR configuration from a table of available SR configurations and signal an index corresponding to the chosen UE-specific SR configuration to the UE 115. The base station 105 may transmit the UE-specific SR configuration in a semi-persistent signaling (e.g., RRC messaging) or in a dynamic signaling (e.g., PDCCH).

The SR repetition configuration may include a number of parameters including a repetition setting, power settings, a resource allocation, and an ACK/NACK procedure. The repetition setting parameter may include a number of repetitions for the SR, a time period for the repetitions, a starting point for the repetitions, or a combination thereof. The power settings may include power boosts to certain repetitions of the SR based on channel conditions or based on latency requirements. The resource allocation parameter may include on which resources in a time-frequency domain to transmit the SR repetitions. For example, the resource allocation may include a hopping pattern, allocating multiple resources within the same symbol, or cyclic shifts of resources between resource blocks. The ACK/NACK procedure parameter may include an indication of how the UE 115 should respond when there is a need to transmit an ACK/NACK feedback in response to URLLC data and an SR in the same symbol. For example, the UE 115 may multiplex the SR and ACK/NACK feedback together or transmit either the SR or ACK/NACK feedback based on a priority between the two transmissions.

Figure 2:
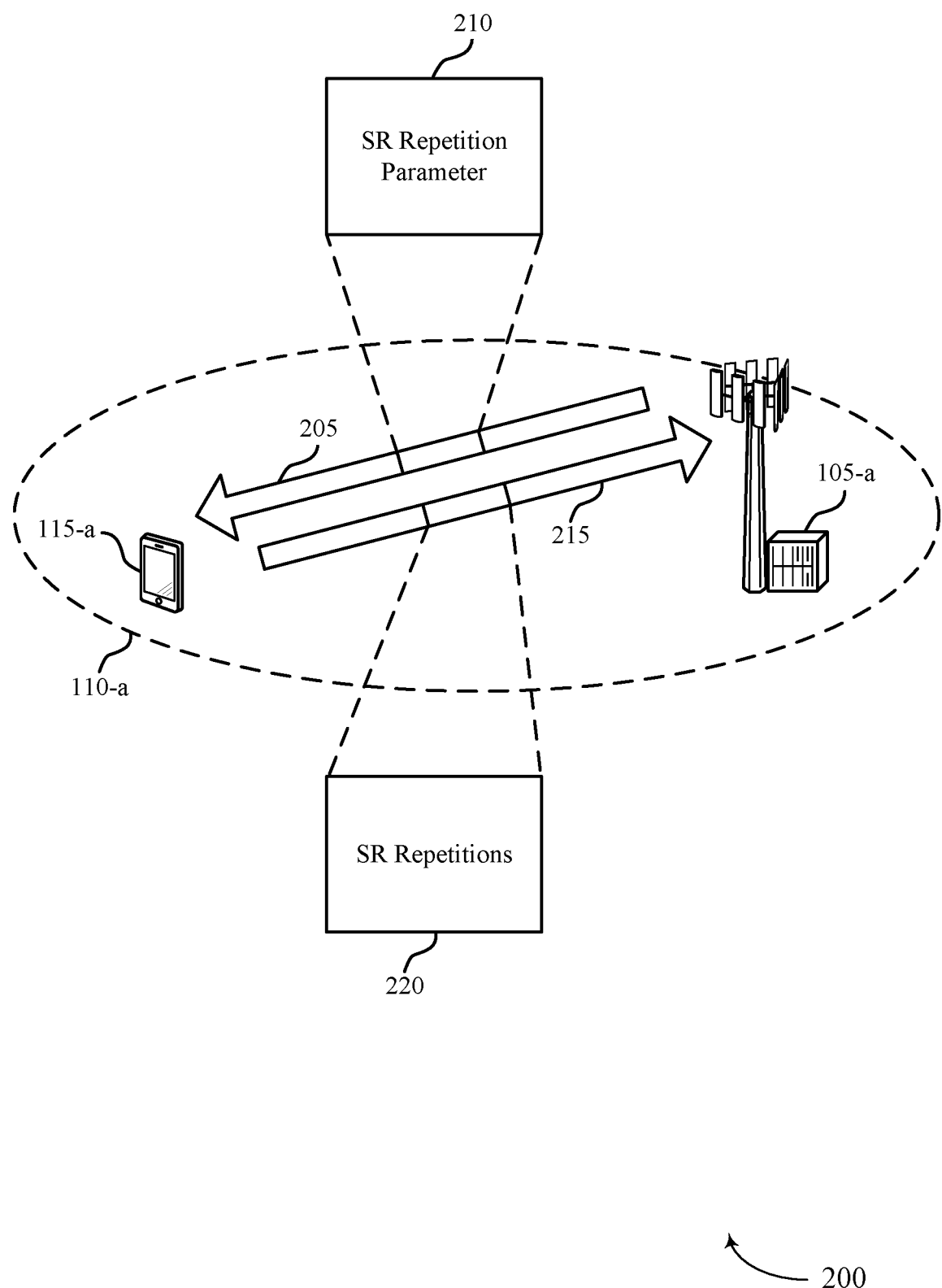
FIG. 2 illustrates an example of a wireless communications system that supports UE-specific SR repetitions (e.g., retransmissions) in accordance with aspects of the present disclosure.

FIG. 2 illustrates an example of a wireless communications system 200 that supports UE-specific SR repetitions (e.g., retransmissions) in accordance with various aspects of the present disclosure. In some examples, wireless communications system 200 may implement aspects of wireless communications system 100. In some examples, wireless communications system 200 may operate in a URLLC system. A base station 105-a may indicate an SR repetition parameter 210 corresponding to an SR repetition configuration specific to a UE 115-a on resources of a carrier 205 to UE 115-a. Accordingly, UE 115-a may transmit one or more SR repetitions 220 corresponding to the SR repetition configuration on resources of a carrier 215.

In some cases, base station 105-a may determine the SR repetition configuration for UE 115-a based on specific conditions for UE 115-a. In some cases, these UE-specific conditions may include a traffic priority, UE link budget, latency requirements, historical requirements, etc. In some cases, base station 105-a may choose the UE-specific SR configuration from a table of available SR configurations and signal an index corresponding to the chosen UE-specific SR configuration to UE 115-a. Additionally, base station 105-a may transmit the SR repetition parameter 210 corresponding to the UE-specific SR configuration via semi-persistent signaling (e.g., RRC messaging) or via dynamic signaling (e.g., PDCCH) on carrier 205. The SR repetition configuration may include a number of parameters including a repetition setting, power settings, a resource allocation, and an ACK/NACK procedure.

The repetition setting parameter may include a number of repetitions for the SR, a time period for the repetitions, a starting point for the repetitions, or a combination thereof. For example, base station 105-a may select a certain number of SR repetitions for UE 115-a based on requirements of reliability and latency. In some cases, a higher number of repetitions (e.g., four (4)) may be chosen for UE 115-a if it is farther from base station 105-a (i.e., cell-edge UE) and, as a result, has a lower link budget. Alternatively, a lower number of repetitions (e.g., zero (0) or one (1)) may be chosen if UE 115-a is closer to base station 105-a (i.e., cell-center UE) and, as a result, has a higher link budget. In general, the lower the expected losses and the better the link budget may result in a lower number of chosen repetitions because of the higher reliability of the base station correctly receiving the SR at a quicker time (i.e., lower latency). However, base station 105-a may choose more or fewer repetitions based on other UE-specific conditions as specified above.

Additionally or alternatively, base station 105-a may choose a time period for the repetitions based on latency requirements. For example, base station 105-a may choose a short repetition period (e.g., one (1) or two (2) OFDM symbols, etc.) for UEs 115 with lower latency requirements. Additionally, base station 105-a may choose a starting point for the repetitions based on latency requirements (i.e., a more frequent starting point may be chosen for UEs 115 with lower latency requirements). For example, the SR starting transmission point may be n, n+4, n+8, etc. for less than or equal to four (4) repetitions or may be n, n+1, n+2, etc. for less than or equal to one (1) repetition, where n refers to a symbol index. Base station 105-a may choose the starting point jointly based on the chosen number and period of SR repetitions. Additionally, the repetitions may cross slot/subframe boundaries.

As a result of choosing the number, period, and starting point for the SR repetitions for UE 115-a, base station 105-a may perform a combined detection/decoding of a transmitted SR from UE 115-a to improve reliability. For example, a selected SR repetition configuration may include four (4) SR repetitions at starting points n, n+4, n+8, etc., with one (1) symbol periodicity. If base station 105-a misses the SR at symbols n and n+1, then at symbol n+2, it can combine the received signal for symbols n, n+1, and n+2 for detecting the transmitted SR from UE 115-a. Additionally, base station 105-a may perform a combined decoding if the SR carries information for other purposes. The size of the memory utilized to store the repeated SR signals may be small since a payload size for the SR is small. In some cases, an SR response window (i.e., a time window for UE 115-a to receive a response from base station 105-a for a transmitted SR) may remain consistent irrespective of the chosen repetition parameters.

The power settings may include power boosts to certain repetitions of the SR based on channel conditions or based on latency requirements. For example, base station 105-a may choose a higher power for certain repetitions if it is known beforehand that one or more symbols have better channel conditions, which may increase reliability. In another example, base station 105-a may boost the SR power when traffic with lower latency requirements is detected. As a result of the lower latency requirements, the number of SR repetitions and the size of the SR response window may be reduced, and increasing the SR power may serve an equivalent purpose of having more SR repetitions. As opposed to other power boosting or ramping procedures (e.g., LTE physical random access channel (PRACH) power ramping), base station 105-a may boost the power based on the channel conditions or latency requirements instead of unsuccessful transmission attempts. In some cases, base station 105-a may signal a power setting parameter indicating the power setting via PDCCH. For example, base station 105-a may signal UE 115-a to transmit an SR in a certain subframe or symbol with a certain power setting (e.g., low, medium, or high power setting). In such cases, by transmitting the power settings using PDCCH, dynamically changing channel conditions may be accounted for, and an appropriate power boost may be utilized by UE 115-a based on various changes in the channel conditions.

The resource allocation parameter may include an indication of which resources in a time-frequency domain may be used to transmit the SR repetitions specific to UE 115-a. For example, the resources utilized for the SR repetitions may be based off a hopping pattern in time-frequency resources. Additionally or alternatively, the resources utilized for the SR repetitions may be allocated in the same or in different symbols (e.g., two separate resources for the SR in one symbol). Additionally or alternatively, the resources utilized for the SR repetitions may be based off cyclic shifts within a resource block. In some cases, base station 105-a may configure the resource allocation for the SR repetitions for each specific UE 115, including UE 115-a. The UE-specific resource allocations may randomize the SR repetitive transmissions. The randomization may reduce collisions with other SRs of other UEs 115 or uplink control information (UCI) transmissions. Additionally, the randomization may leverage hopping diversity (e.g., time-frequency diversity), which may improve reliability.

The ACK/NACK procedure parameter may include an indication of how the UE 115 should respond when there is a need to transmit an ACK/NACK feedback in response to URLLC data and an SR in the same symbol. For example, if both the ACK/NACK feedback and SR are both urgent, base station 105-a may signal UE 115-a to multiplex the ACK/NACK feedback and SR together. Alternatively, if the SR takes more weight or is more urgent (e.g., no repetition is configured), base station 105-a may signal UE 115-a to drop the ACK/NACK feedback and transmit the SR. Alternatively, if the ACK/NACK feedback takes more weight and is more urgent (e.g., a number of SR repetitions are configured), base station 105-a may signal UE 115-a to drop one of the SR repetitions that corresponds to the symbol for the ACK/NACK feedback.

FIGS. 3A, 3B, and 3C illustrate examples of SR repetition resource allocation configurations 300, 302, and 304, respectively, that support UE-specific SR repetitions (e.g., retransmissions) in accordance with various aspects of the present disclosure. In some examples, SR repetition resource allocation configurations 300, 302, and 304 may implement aspects of wireless communications systems 100 and 200. It is to be understood that SR repetition resource allocation configurations 300, 302, and 304 illustrate examples of possible resource allocations for an SR repetition configuration as described with reference to FIG. 2 and do not include an exhaustive list of all possible resource allocations. SR repetition resource allocation configurations 300, 302, and 304 may include a number of frequency resources 305 and symbols 310.

SR repetition resource allocation configuration 300 may include two (2) SR repetitions across the same frequency resources 305-a for two symbols 310-a. In the present example, a base station 105 may configure a UE 115 to transmit the SR repetitions such that there are two repetitions that start at a third symbol 310-a. Additionally, in some cases, different UEs 115 may utilize the same time-frequency resources as the UE 115. For example, the different UEs 115 may utilize the same resource blocks, but each may utilize a cyclic shift.

SR repetition resource allocation configuration 302 may include four (4) SR repetitions across different frequency resources 305-b for different symbols 310-b. In some cases, the resources may be allocated for the SR repetitions according to a hopping pattern specific to a UE 115. As described above, the UE-specific resource allocations may randomize the SR repetitive transmissions for each UE 115. The randomization may reduce collisions with other SRs of other UEs 115 or UCI transmissions. Additionally, the randomization may leverage hopping diversity (e.g., time-frequency diversity), which may improve reliability.

SR repetition resource allocation configuration 304 may include four (4) SR repetitions across different frequency resources 305-c for two (2) symbols 310-c. A base station 105 may allocate multiple frequency resources 305-c for SR repetitions within the same symbol 310-c. In some cases, the present example may illustrate one SR repetition configuration with four (4) SR repetitions on four frequency resources 305-c for two (2) symbols 310-c. Alternatively, the present example may illustrate two SR repetition configurations with two (2) SR repetitions each on two frequency resources 305-c of one (1) symbol 310-c that have different starting periods.

Figure 4:
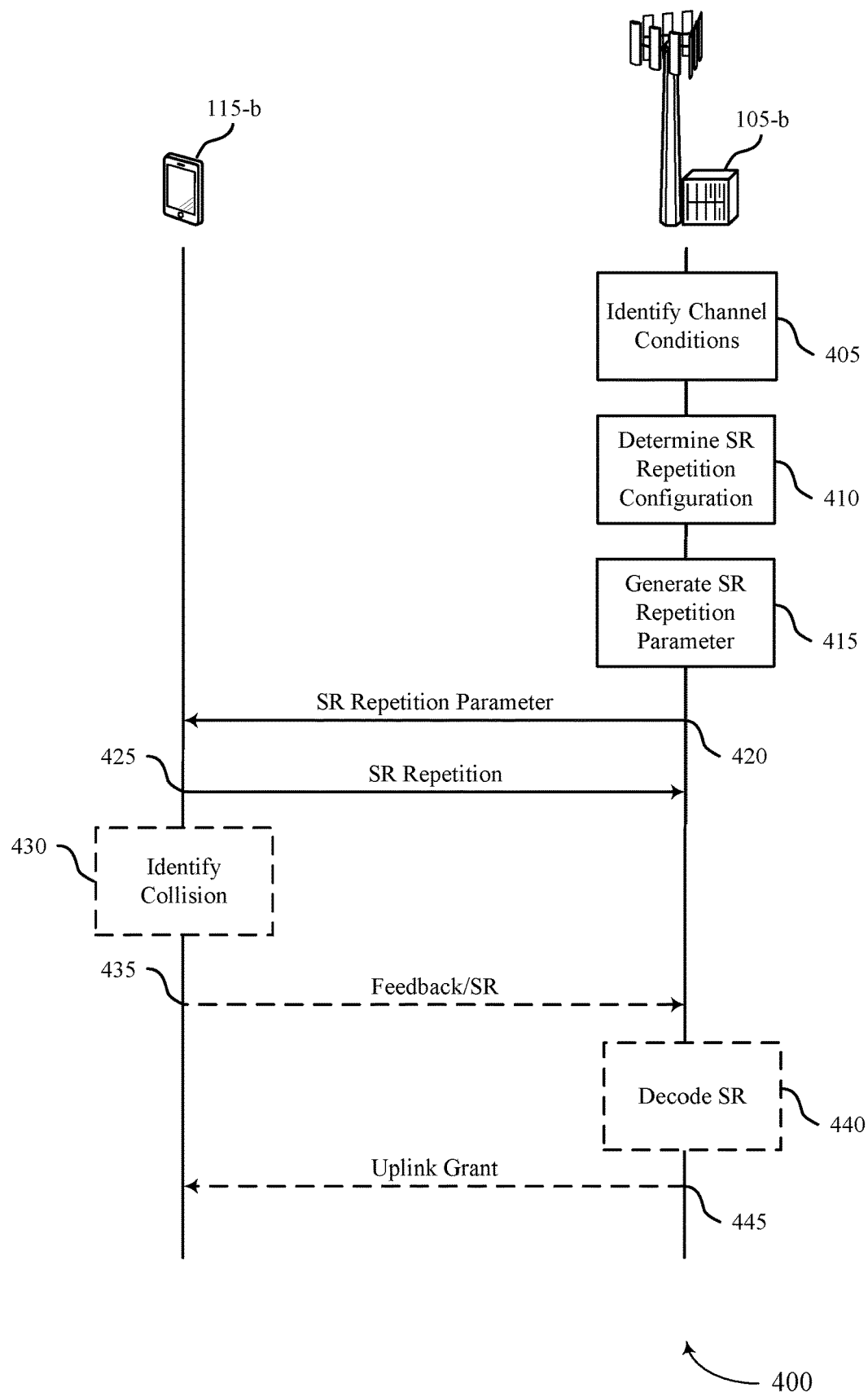
FIG. 4 illustrates an example of a process flow that supports UE-specific SR repetitions (e.g., retransmissions) in accordance with aspects of the present disclosure.

FIG. 4 illustrates an example of a process flow 400 that supports UE-specific SR repetitions (e.g., retransmissions) in accordance with various aspects of the present disclosure. In some examples, process flow 400 may implement aspects of wireless communications systems 100 and 200.

In the following description of the process flow 400, the operations between the UE 115-b and base station 105-b may be performed in different orders or at different times. Certain operations may also be left out of the process flow 400, or other operations may be added to the process flow 400.

At 405, base station 105-b may identify channel conditions associated with a UE (e.g., UE 115-b). At 410, base station 105-b may determine an SR repetition configuration for UE 115-b based on the channel conditions. In some cases, the SR repetition configuration may be specific to UE 115-b (e.g., UE-specific) and also may be based on one or more of traffic priority for UE 115-b, a UE link budget, a traffic latency requirement, or historical SR performance.

Additionally, determining the SR repetition configuration UE 115-b may include determining an SR repetition number indicating a maximum number of SR repetitions by UE 115-b. Additionally or alternatively, base station 105-b may determine an SR repetition periodicity for UE 115-b to transmit a repetition of an SR. Base station 105-b may further determine a starting symbol period for the UE to transmit a repetition of an SR, the starting symbol period being based on the SR repetition number and the SR repetition periodicity. In some cases, base station 105-b may determine a power configuration for UE 115-b to transmit a repetition of an SR, the power configuration being based on the channel conditions. The power configuration may include an indication of the transmission power for transmitting the repetition of the SR based on an SR repetition number. Additionally, base station 105-b may configure an SR resource allocation for UE 115-b to transmit a repetition of an SR. The SR resource allocation may indicate a set of time-frequency resources for the repetition of the SR using a hopping pattern, or a same symbol period, or multiple symbol periods, or cyclic shifts in a single resource block, different radio frequency bands, or any combination thereof.

At 415, base station 105-b may generate an SR repetition parameter for UE 115-b based on the SR repetition configuration. In some cases, the SR repetition parameter be based on a traffic priority for UE 115-b, or a UE link budget, or a latency requirement of UE 115-b, or a reliability requirement of UE 115-b, or historical SR performance of UE 115-b, a location of UE 115-b, or any combination thereof. In some cases, the SR repetition parameter may include an index of the SR repetition configuration. Additionally or alternatively, the SR repetition configuration may be indicative of the SR repetition number, the SR repetition periodicity, the starting symbol period, the power configuration, the SR resource allocation, or a combination thereof.

At 420, base station 105-b may transmit the SR repetition parameter to UE 115-b. In some cases, the SR repetition parameter may be transmitted via RRC messaging or via a PDCCH.

At 425, UE 115-b may transmit a repetition of an SR to the base station based on the received SR repetition parameter. Additionally, UE 115-b may adjust a transmission power for transmitting the repetition of the SR based on the power configuration. For example, UE 115-b may increase the transmission power for the repetition of the SR in symbol periods known by UE 115-b to have a channel condition that satisfies a threshold. In some cases, UE 115-b may transmit the SR during an SR response window until a maximum number of SR repetitions is satisfied. Additionally or alternatively, UE 115-b may transmit the SR during an SR response window until a resource grant is received from base station 105-b. In some cases, UE 115-b may transmit the repetition of the SR in multiple slots or subframes. In some cases, the repetition of the SR may be transmitted as part of URLLC. Base station 105-b may receive repetitions of the SR during the SR response window in accordance with the SR repetition configuration.

At 430, UE 115-b may identify a collision between a transmission of a feedback message (e.g., ACK/NACK feedback) and the repetition of the SR. Additionally, UE 115-b may determine a priority of the feedback message and a priority of the repetition of the SR. At 435, UE 115-b may transmit the feedback message, or the repetition of the SR, or both, based on the priority of the feedback message and the priority of the repetition of the SR.

At 440, base station 105-b may decode the SR based on a combination of the received repetitions of the SR. At 445, base station 105-b may transmit an uplink grant to UE 115-b based on the received SR repetitions. In some cases, base station 105-*b* may transmit the uplink grant based on a successful decoding of the combination of the received repetitions of the SR.

Figure 5:
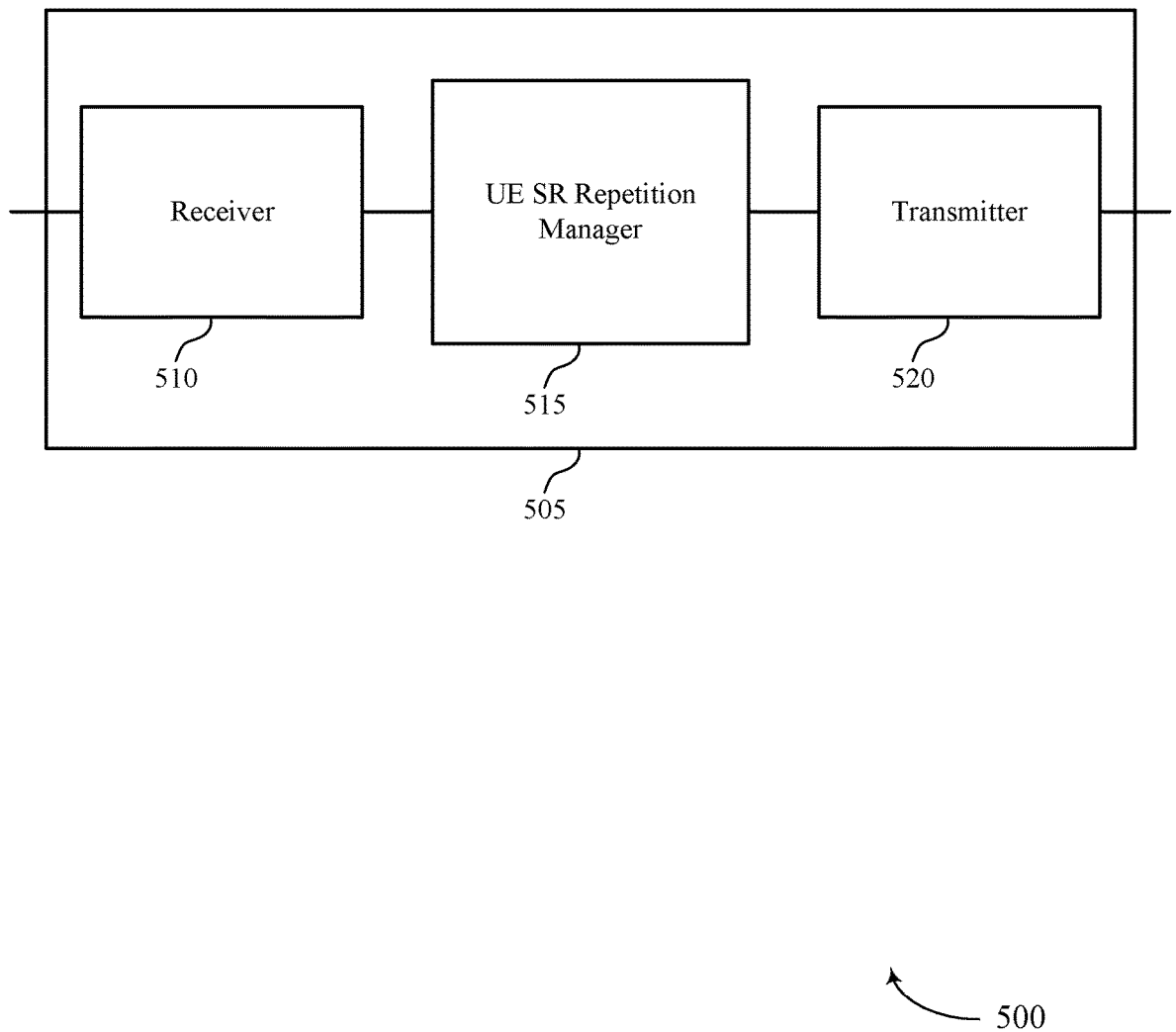
FIGS. 5 through 7 show block diagrams of a device that supports UE-specific SR repetitions (e.g., retransmissions) in accordance with aspects of the present disclosure.

FIG. 5 shows a block diagram 500 of a wireless device 505 that supports UE-specific SR repetitions (e.g., retransmissions) in accordance with aspects of the present disclosure. Wireless device 505 may be an example of aspects of a UE 115 as described herein. Wireless device 505 may include receiver 510, UE SR repetition manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to UE-specific scheduling request repetitions, etc.). Information may be passed on to other components of the device. The receiver 510 may be an example of aspects of the transceiver 835 described with reference to FIG. 8. The receiver 510 may utilize a single antenna or a set of antennas.

UE SR repetition manager 515 may be an example of aspects of the UE SR repetition manager 815 described with reference to FIG. 8. UE SR repetition manager 515 and/or at least some of its various sub-components may be implemented in hardware, software executed by a processor, firmware, or any combination thereof. If implemented in software executed by a processor, the functions of the UE SR repetition manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE SR repetition manager 515 and/or at least some of its various sub-components may be physically located at various positions, including being distributed such that portions of functions are implemented at different physical locations by one or more physical devices. In some examples, UE SR repetition manager 515 and/or at least some of its various sub-components may be a separate and distinct component in accordance with various aspects of the present disclosure. In other examples, UE SR repetition manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE SR repetition manager 515 may receive, from a base station, a message including an SR repetition parameter for the UE and transmit a repetition of an SR to the base station based on the received SR repetition parameter.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
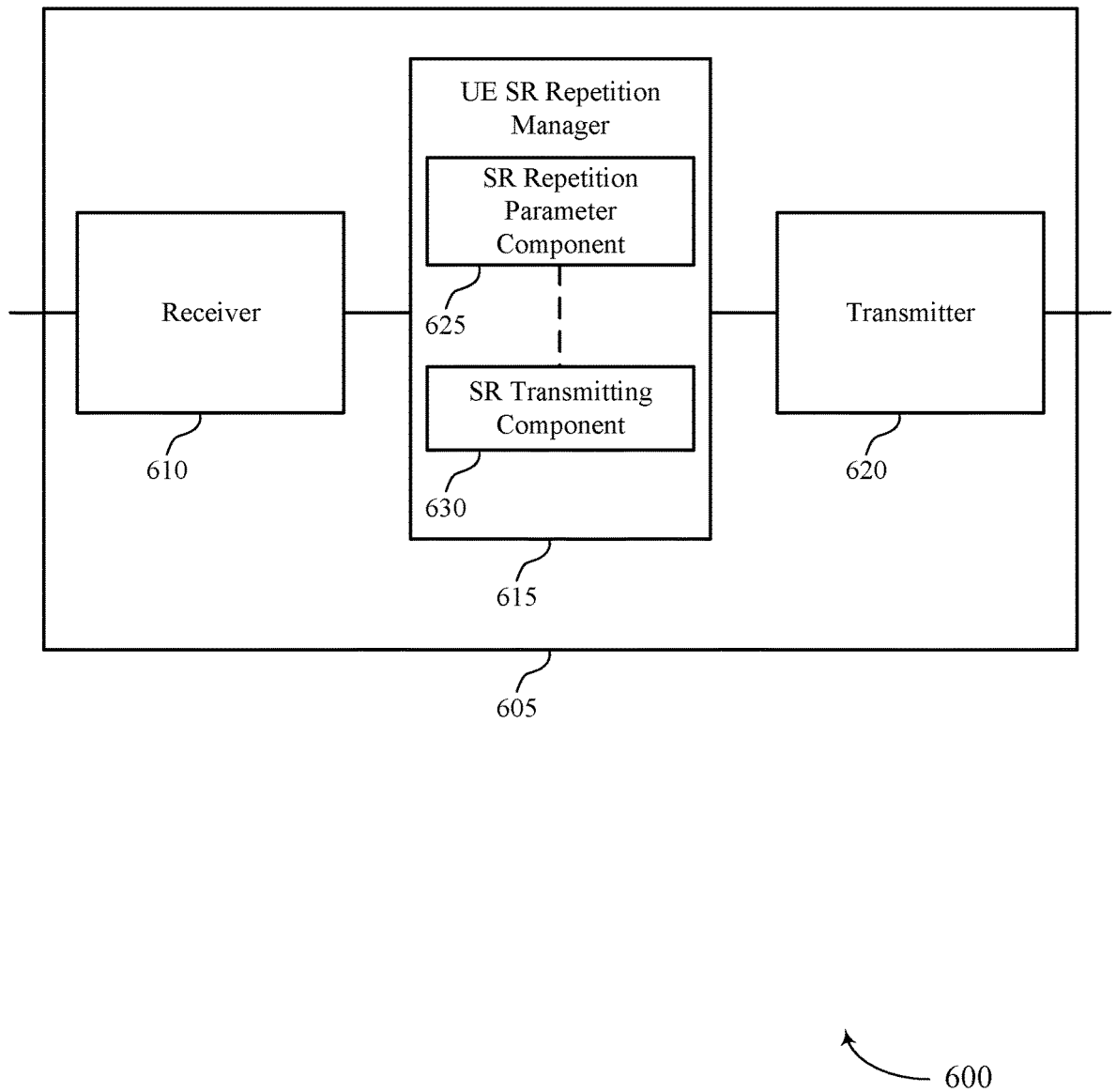

FIG. 6 shows a block diagram 600 of a wireless device 605 that supports UE-specific SR repetitions (e.g., retransmissions) in accordance with aspects of the present disclosure. Wireless device 605 may be an example of aspects of a wireless device 505 or a UE 115 as described with reference to FIG. 5. Wireless device 605 may include receiver 610, UE SR repetition manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to UE-specific scheduling request repetitions, etc.). Information may be passed on to other components of the device. The receiver 610 may be an example of aspects of the transceiver 835 described with reference to FIG. 8. The receiver 610 may utilize a single antenna or a set of antennas.

UE SR repetition manager 615 may be an example of aspects of the UE SR repetition manager 815 described with reference to FIG. 8. UE SR repetition manager 615 may also include SR repetition parameter component 625 and SR transmitting component 630.

SR repetition parameter component 625 may receive, from a base station via the receiver 610, a message including an SR repetition parameter for the UE. In some cases, the SR repetition parameter may be indicative of an SR repetition configuration. In some cases, the SR repetition parameter may be indicative of an SR repetition number indicating a maximum number of SR repetitions. Additionally or alternatively, the SR repetition parameter may be indicative of an SR repetition periodicity. In some cases, the SR repetition parameter may be indicative of a starting symbol period to begin transmitting the repetition of the SR, the starting symbol period being based on an SR repetition number and an SR repetition periodicity, where the repetition of the SR is transmitted using the starting symbol period. In some cases, the SR repetition parameter may be UE-specific and based on one or more of traffic priority for the UE, a UE link budget, a traffic latency requirement, or historical SR performance. In some cases, the message including the SR repetition parameter for the UE may be transmitted via a RRC message or via a PDCCH.

SR transmitting component 630 may transmit a repetition of an SR to the base station based on the received SR repetition parameter. In some cases, transmitting the repetition of the SR may include transmitting the SR during an SR response window until a maximum number of SR repetitions is satisfied. Additionally or alternatively, transmitting the repetition of the SR may include transmitting the SR during an SR response window until a resource grant is received from the base station. In some cases, transmitting the repetition of the SR may include transmitting the repetition of the SR in multiple slots or subframes. In some cases, the repetition of the SR may be transmitted as part of URLLC.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
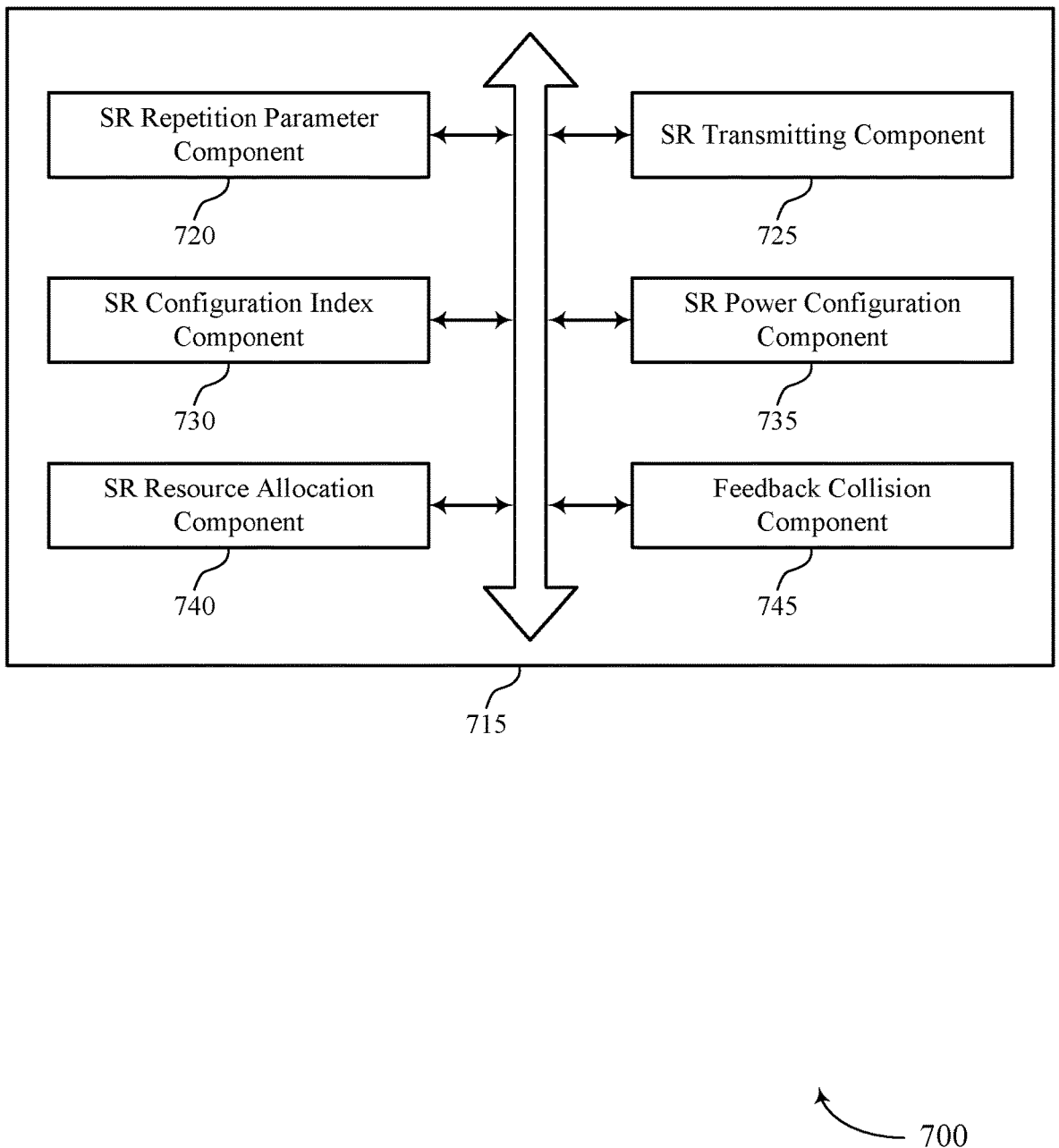

FIG. 7 shows a block diagram 700 of a UE SR repetition manager 715 that supports UE-specific SR repetitions (e.g., retransmissions) in accordance with aspects of the present disclosure. The UE SR repetition manager 715 may be an example of aspects of a UE SR repetition manager 515, a UE SR repetition manager 615, or a UE SR repetition manager 815 described with reference to FIGS. 5, 6, and 8. The UE SR repetition manager 715 may include SR repetition parameter component 720, SR transmitting component 725, SR configuration index component 730, SR power configuration component 735, SR resource allocation component 740, and feedback collision component 745. Each of these modules may communicate, directly or indirectly, with one another (e.g., via one or more buses).

SR repetition parameter component 720 may receive, from a base station, a message including an SR repetition parameter for the UE. In some cases, the SR repetition parameter may be indicative of an SR repetition configuration. In some cases, the SR repetition parameter may be indicative of an SR repetition number indicating a maximum number of SR repetitions. In some cases, the SR repetition parameter may be indicative of an SR repetition periodicity. In some cases, the SR repetition parameter may be indicative of a starting symbol period to begin transmitting the repetition of the SR, the starting symbol period being based on an SR repetition number and an SR repetition periodicity, where the repetition of the SR is transmitted using the starting symbol period. In some cases, the SR repetition parameter may be UE-specific and based on one or more of traffic priority for the UE, a UE link budget, a traffic latency requirement, or historical SR performance. In some cases, the message including the SR repetition parameter for the UE may be transmitted via a RRC message or via a PDCCH.

SR transmitting component 725 may transmit a repetition of an SR to the base station based on the received SR repetition parameter. In some cases, transmitting the repetition of the SR may include transmitting the SR during an SR response window until a maximum number of SR repetitions is satisfied. Additionally or alternatively, transmitting the repetition of the SR may include transmitting the SR during an SR response window until a resource grant is received from the base station. In some cases, transmitting the repetition of the SR may include transmitting the repetition of the SR in multiple slots or subframes. In some cases, the repetition of the SR may be transmitted as part of URLLC.

SR configuration index component 730 may indicate an index of an SR repetition configuration for the UE, based at least in part on the SR repetition parameter. SR power configuration component 735 may adjust a transmission power for transmitting the repetition of the SR based on the power configuration. In some cases, adjusting the transmission power for transmitting the repetition of the SR may include increasing the transmission power for the repetition of the SR in symbol periods known by the UE to have a channel condition that satisfies a threshold. In some cases, the SR repetition parameter may be indicative of the transmission power for transmitting the repetition of the SR based on an SR repetition number.

SR resource allocation component 740 may indicate an SR resource allocation, where the repetition of the SR is transmitted on a set of time-frequency resources in accordance with the SR resource allocation. In some cases, the SR resource allocation may be indicative of transmitting the repetition of the SR using a hopping pattern, or a same symbol period, or multiple symbol periods, or cyclic shifts in a single resource block, different radio frequency bands, or any combination thereof.

Feedback collision component 745 may identify a collision between a transmission of a feedback message and the repetition of the SR, determine a priority of the feedback message and a priority of the repetition of the SR, and transmit the feedback message, or the repetition of the SR, or both, based on the priority of the feedback message and the priority of the repetition of the SR.

Figure 8:
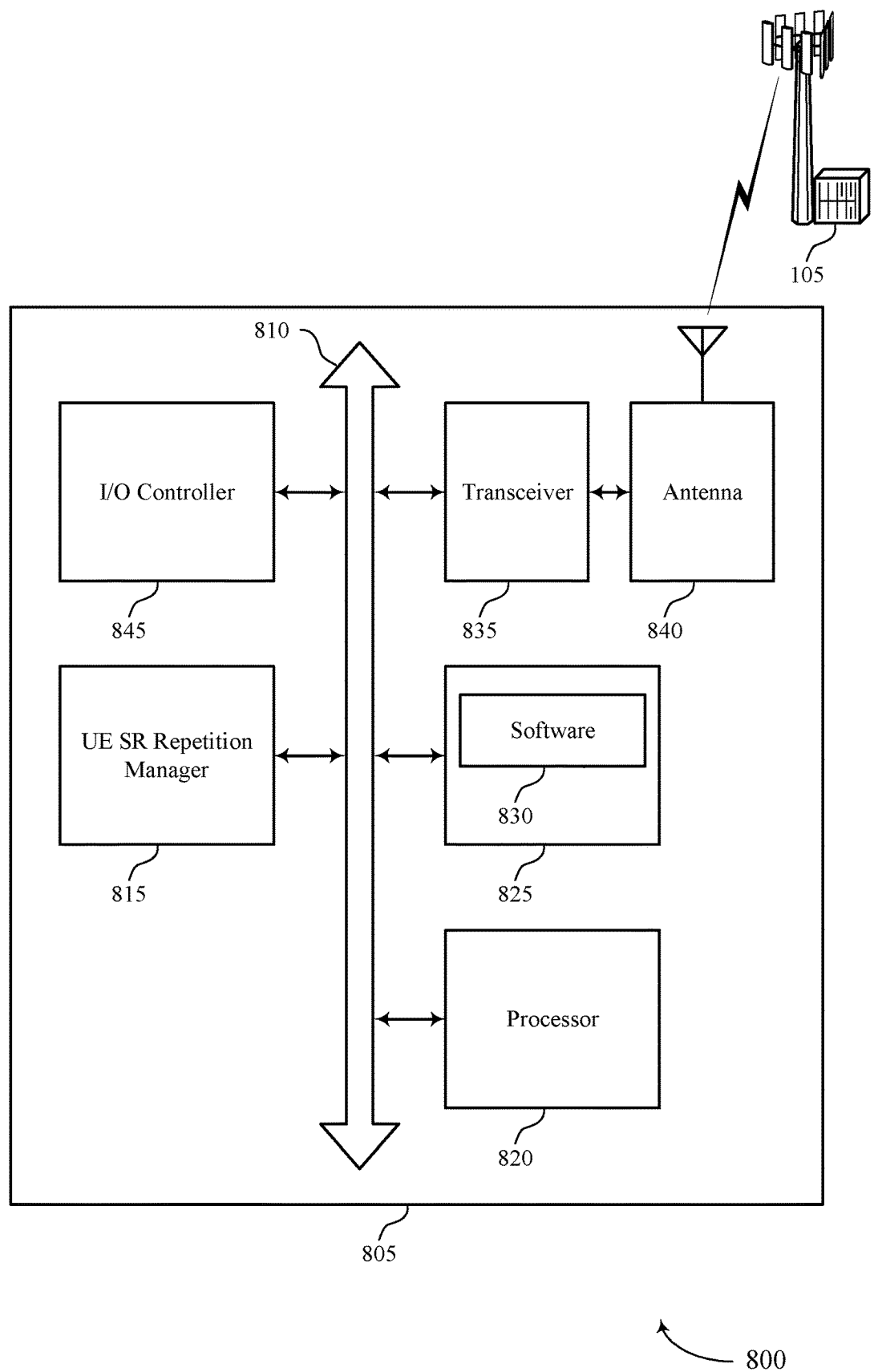
FIG. 8 illustrates a block diagram of a system including a UE that supports UE-specific SR repetitions (e.g., retransmissions) in accordance with aspects of the present disclosure.

FIG. 8 shows a diagram of a system 800 including a device 805 that supports UE-specific SR repetitions (e.g., retransmissions) in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE SR repetition manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting UE-specific scheduling request repetitions).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support UE-specific scheduling request repetitions. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
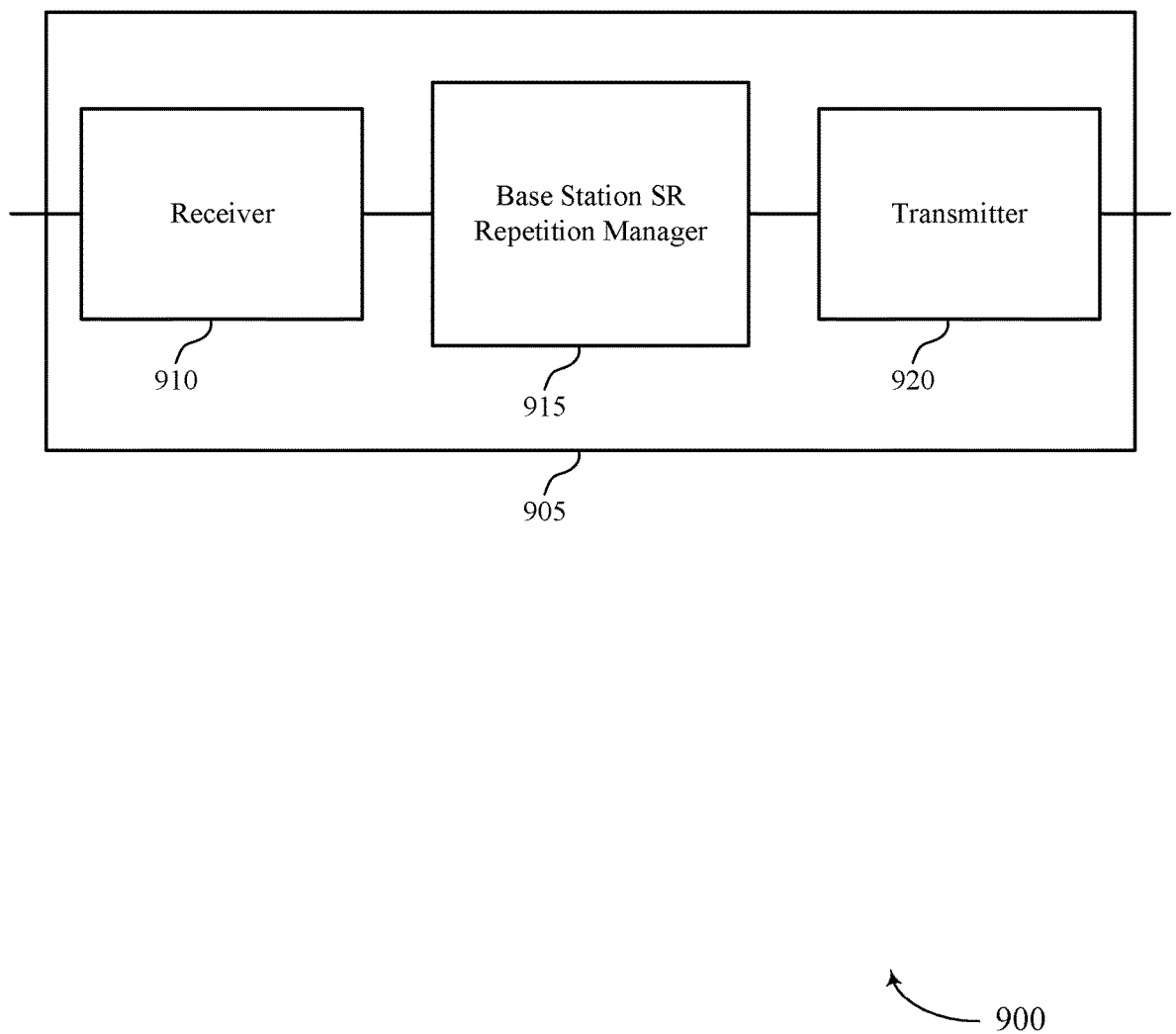
FIGS. 9 through 11 show block diagrams of a device that supports UE-specific SR repetitions (e.g., retransmissions) in accordance with aspects of the present disclosure.

FIG. 9 shows a block diagram 900 of a wireless device 905 that supports UE-specific SR repetitions (e.g., retransmissions) in accordance with aspects of the present disclosure. Wireless device 905 may be an example of aspects of a base station 105 as described herein. Wireless device 905 may include receiver 910, base station SR repetition manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UE-specific scheduling request repetitions, etc.). Information may be passed on to other components of the device. The receiver 910 may be an example of aspects of the transceiver 1235 described with reference to FIG. 12. The receiver 910 may utilize a single antenna or a set of antennas.

Base station SR repetition manager 915 may be an example of aspects of the base station SR repetition manager 1215 described with reference to FIG. 12. Base station SR repetition manager 915 and/or at least some of its various sub-components may be implemented in hardware, software executed by a processor, firmware, or any combination thereof. If implemented in software executed by a processor, the functions of the base station SR repetition manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station SR repetition manager 915 and/or at least some of its various sub-components may be physically located at various positions, including being distributed such that portions of functions are implemented at different physical locations by one or more physical devices. In some examples, base station SR repetition manager 915 and/or at least some of its various sub-components may be a separate and distinct component in accordance with various aspects of the present disclosure. In other examples, base station SR repetition manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station SR repetition manager 915 may identify channel conditions associated with a UE, determine an SR repetition configuration for the UE based on the channel conditions, generate an SR repetition parameter for the UE based on the SR repetition configuration, and transmit the SR repetition parameter to the UE. The SR repetition configuration may be UE-specific and also based on one or more of traffic priority for the UE, a UE link budget, a traffic latency requirement, or historical SR performance.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
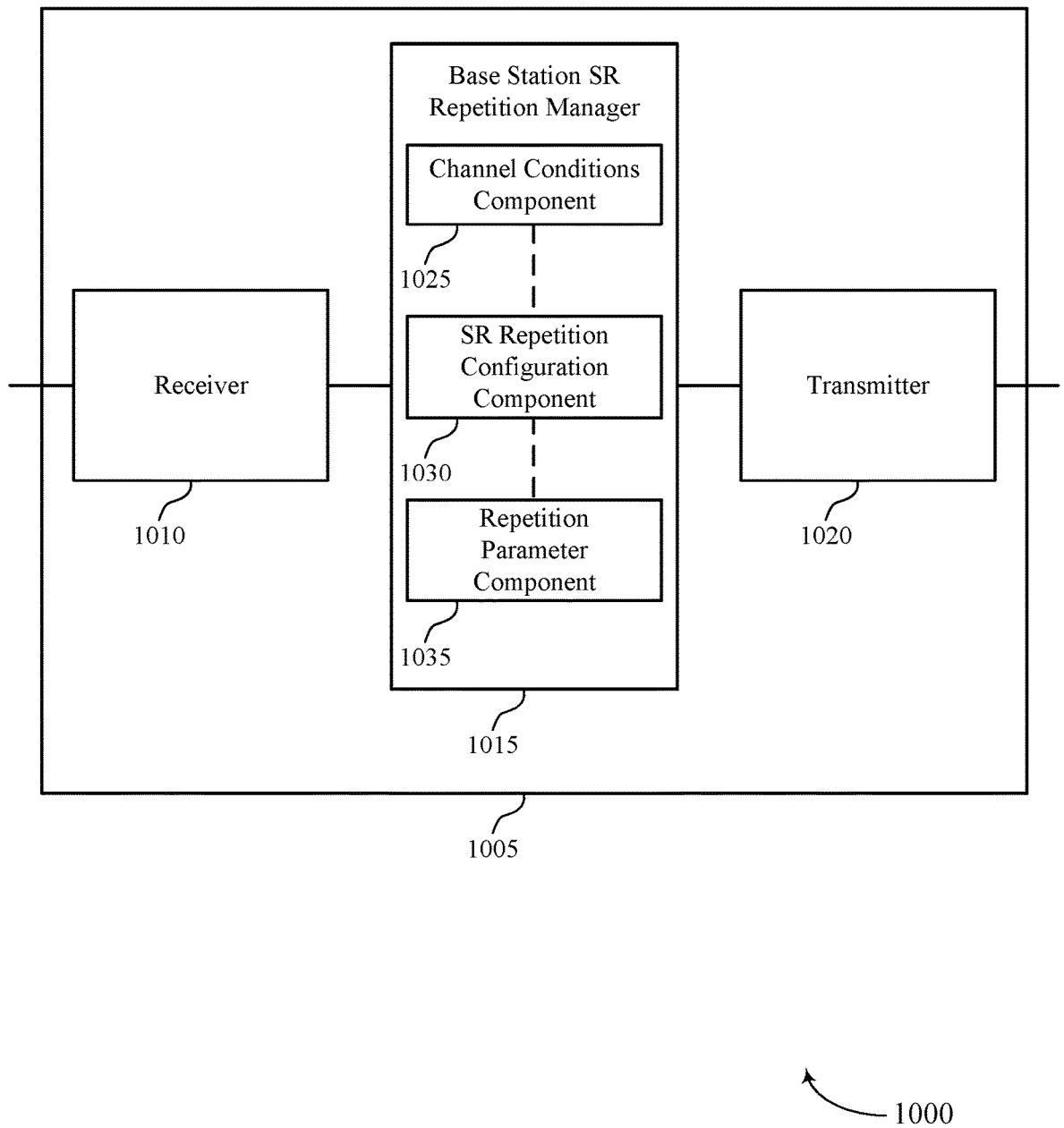

FIG. 10 shows a block diagram 1000 of a wireless device 1005 that supports UE-specific SR repetitions (e.g., retransmissions) in accordance with aspects of the present disclosure. Wireless device 1005 may be an example of aspects of a wireless device 905 or a base station 105 as described with reference to FIG. 9. Wireless device 1005 may include receiver 1010, base station SR repetition manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to UE-specific scheduling request repetitions, etc.). Information may be passed on to other components of the device. The receiver 1010 may be an example of aspects of the transceiver 1235 described with reference to FIG. 12. The receiver 1010 may utilize a single antenna or a set of antennas.

Base station SR repetition manager 1015 may be an example of aspects of the base station SR repetition manager 1215 described with reference to FIG. 12. Base station SR repetition manager 1015 may also include channel conditions component 1025, SR repetition configuration component 1030, and repetition parameter component 1035.

Channel conditions component 1025 may identify channel conditions associated with a UE. SR repetition configuration component 1030 may determine an SR repetition configuration for the UE based on the channel conditions. In some cases, the SR repetition configuration may be UE-specific and based on one or more of traffic priority for the UE, a UE link budget, a traffic latency requirement, or historical SR performance.

Repetition parameter component 1035 may generate an SR repetition parameter for the UE based on the SR repetition configuration and transmit the SR repetition parameter to the UE, determine an SR repetition number indicating a maximum number of SR repetitions by the UE, where the SR repetition parameter is indicative of the SR repetition number, determine an SR repetition periodicity for the UE to transmit a repetition of an SR, where the SR repetition parameter is indicative of the SR repetition periodicity, and determine a starting symbol period for the UE to transmit a repetition of an SR, the starting symbol period being based on an SR repetition number and an SR repetition periodicity, where the SR repetition parameter is indicative of the starting symbol period. In some cases, the SR repetition parameter is based on a traffic priority for the UE, or a UE link budget, or a latency requirement of the UE, or a reliability requirement of the UE, or historical SR performance of the UE, a location of the UE, or any combination thereof. In some cases, the SR repetition parameter is transmitted via RRC messaging or via a PDCCH.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
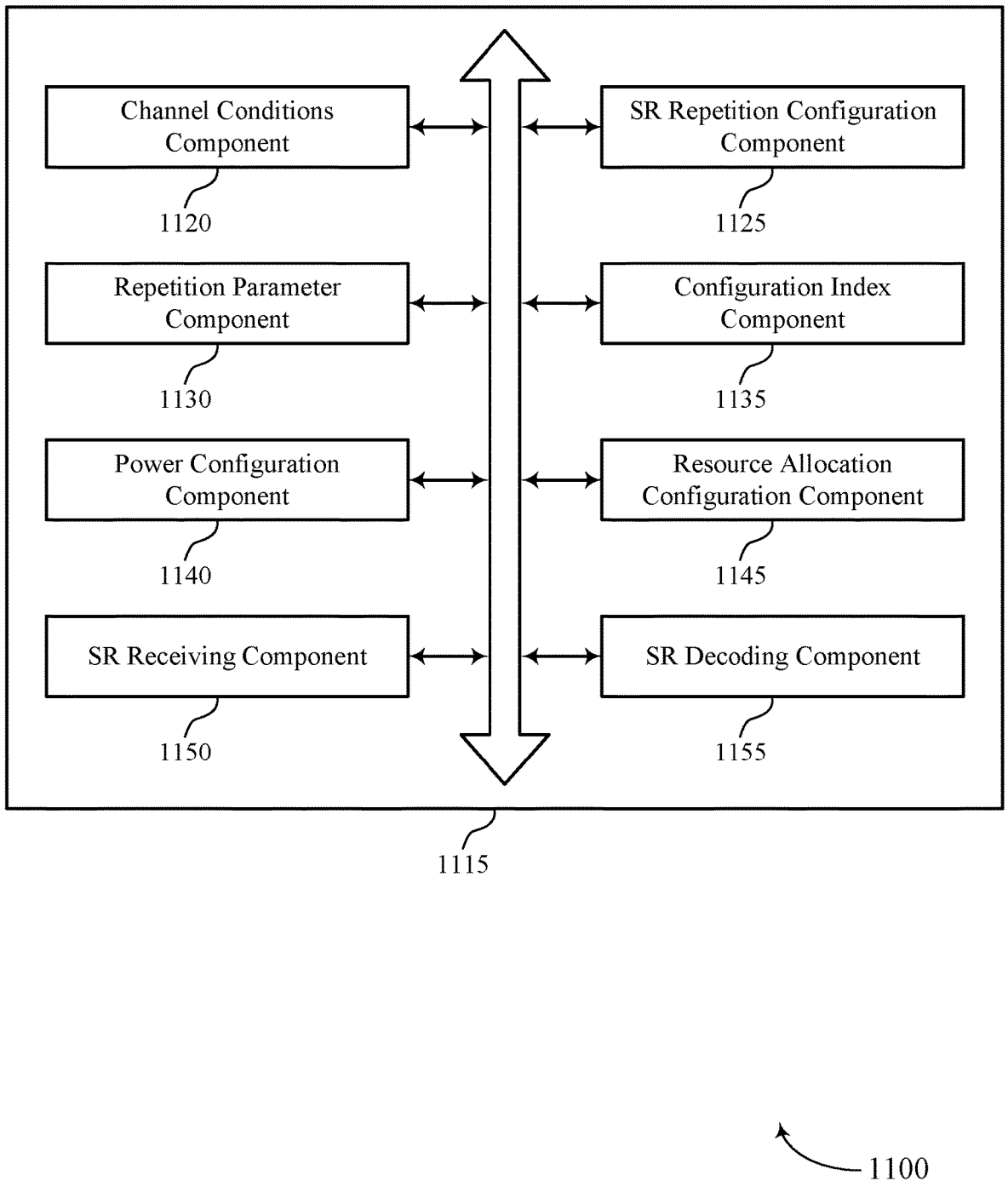

FIG. 11 shows a block diagram 1100 of a base station SR repetition manager 1115 that supports UE-specific SR repetitions (e.g., retransmissions) in accordance with aspects of the present disclosure. The base station SR repetition manager 1115 may be an example of aspects of a base station SR repetition manager 1215 described with reference to FIGS. 9, 10, and 12. The base station SR repetition manager 1115 may include channel conditions component 1120, SR repetition configuration component 1125, repetition parameter component 1130, configuration index component 1135, power configuration component 1140, resource allocation configuration component 1145, SR receiving component 1150, and SR decoding component 1155. Each of these modules may communicate, directly or indirectly, with one another (e.g., via one or more buses).

Channel conditions component 1120 may identify channel conditions associated with a UE. SR repetition configuration component 1125 may determine an SR repetition configuration for the UE based on the channel conditions. In some cases, the SR repetition configuration is UE-specific and based on one or more of traffic priority for the UE, a UE link budget, a traffic latency requirement, or historical SR performance.

Repetition parameter component 1130 may generate an SR repetition parameter for the UE based on the SR repetition configuration and transmit the SR repetition parameter to the UE. In some cases, repetition parameter component 1130 may determine an SR repetition number indicating a maximum number of SR repetitions by the UE, where the SR repetition parameter is indicative of the SR repetition number. Additionally or alternatively, repetition parameter component 1130 may determine an SR repetition periodicity for the UE to transmit a repetition of an SR, where the SR repetition parameter is indicative of the SR repetition periodicity. Additionally, repetition parameter component 1130 may determine a starting symbol period for the UE to transmit a repetition of an SR, the starting symbol period being based on an SR repetition number and an SR repetition periodicity, where the SR repetition parameter is indicative of the starting symbol period. In some cases, the SR repetition parameter may be based on a traffic priority for the UE, or a UE link budget, or a latency requirement of the UE, or a reliability requirement of the UE, or historical SR performance of the UE, a location of the UE, or any combination thereof. In some cases, the SR repetition parameter may be transmitted via RRC messaging or via a PDCCH.

Configuration index component 1135 may indicate an index of the SR repetition configuration. Power configuration component 1140 may determine a power configuration for the UE to transmit a repetition of an SR, the power configuration being based on the channel conditions, where the SR repetition parameter is indicative of the power configuration. In some cases, the power configuration may include an indication of the transmission power for transmitting the repetition of the SR based on an SR repetition number.

Resource allocation configuration component 1145 may configure an SR resource allocation for the UE to transmit a repetition of an SR, where the SR repetition parameter is indicative of the SR resource allocation. In some cases, the SR resource allocation may indicate a set of time-frequency resources for the repetition of the SR using a hopping pattern, or a same symbol period, or multiple symbol periods, or cyclic shifts in a single resource block, different radio frequency bands, or any combination thereof.

SR receiving component 1150 may receive, from the UE, repetitions of an SR during an SR response window in accordance with the SR repetition configuration. SR decoding component 1155 may decode the SR based on a combination of the received repetitions of the SR.

Figure 12:
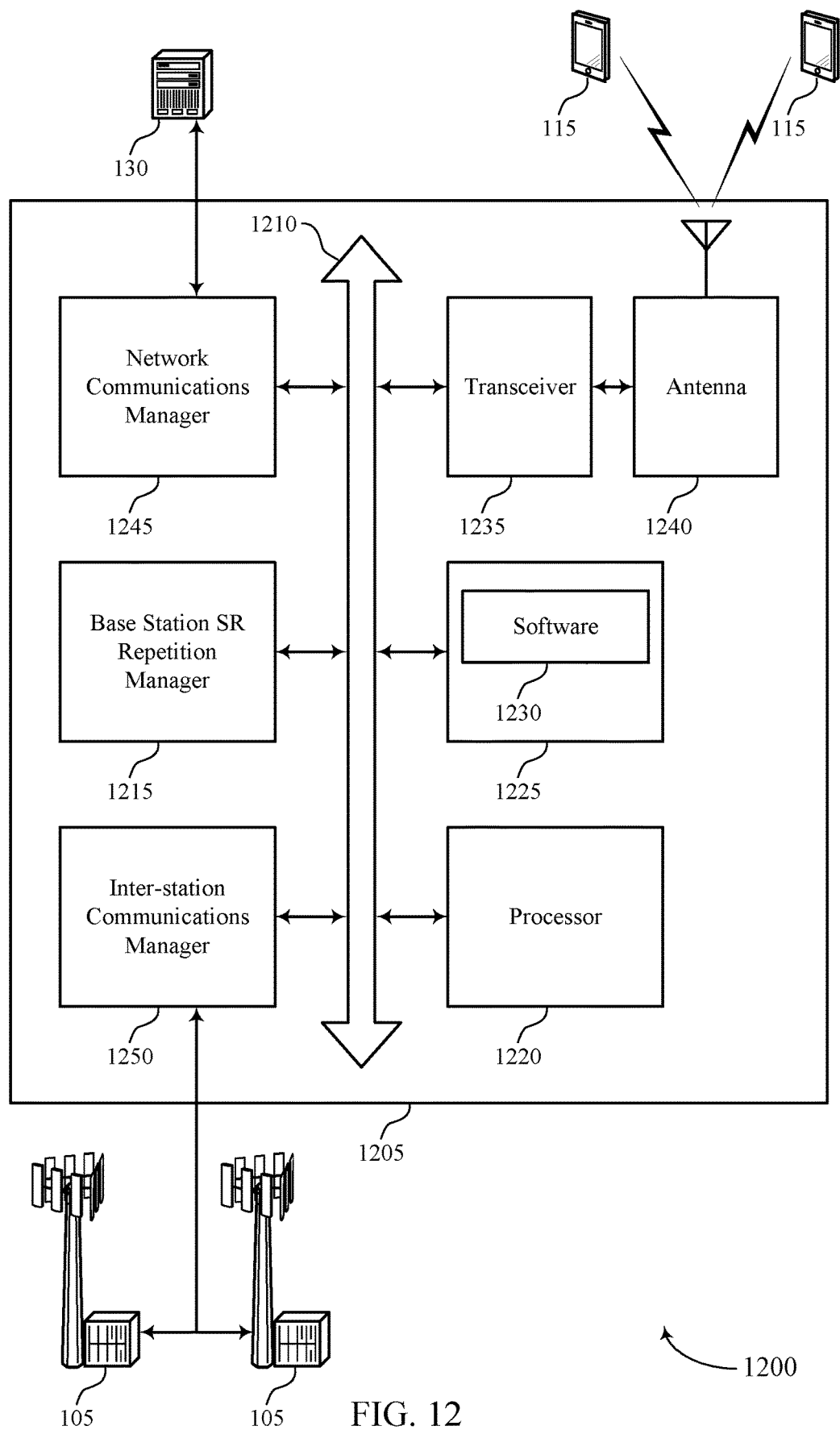
FIG. 12 illustrates a block diagram of a system including a base station that supports UE-specific SR repetitions (e.g., retransmissions) in accordance with aspects of the present disclosure.

FIG. 12 shows a diagram of a system 1200 including a device 1205 that supports UE-specific SR repetitions (e.g., retransmissions) in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station SR repetition manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting UE-specific scheduling request repetitions).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support UE-specific scheduling request repetitions. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 6interface within an LTE/LTE-A wireless communication network technology to provide communication between base stations 105.

Figure 13:
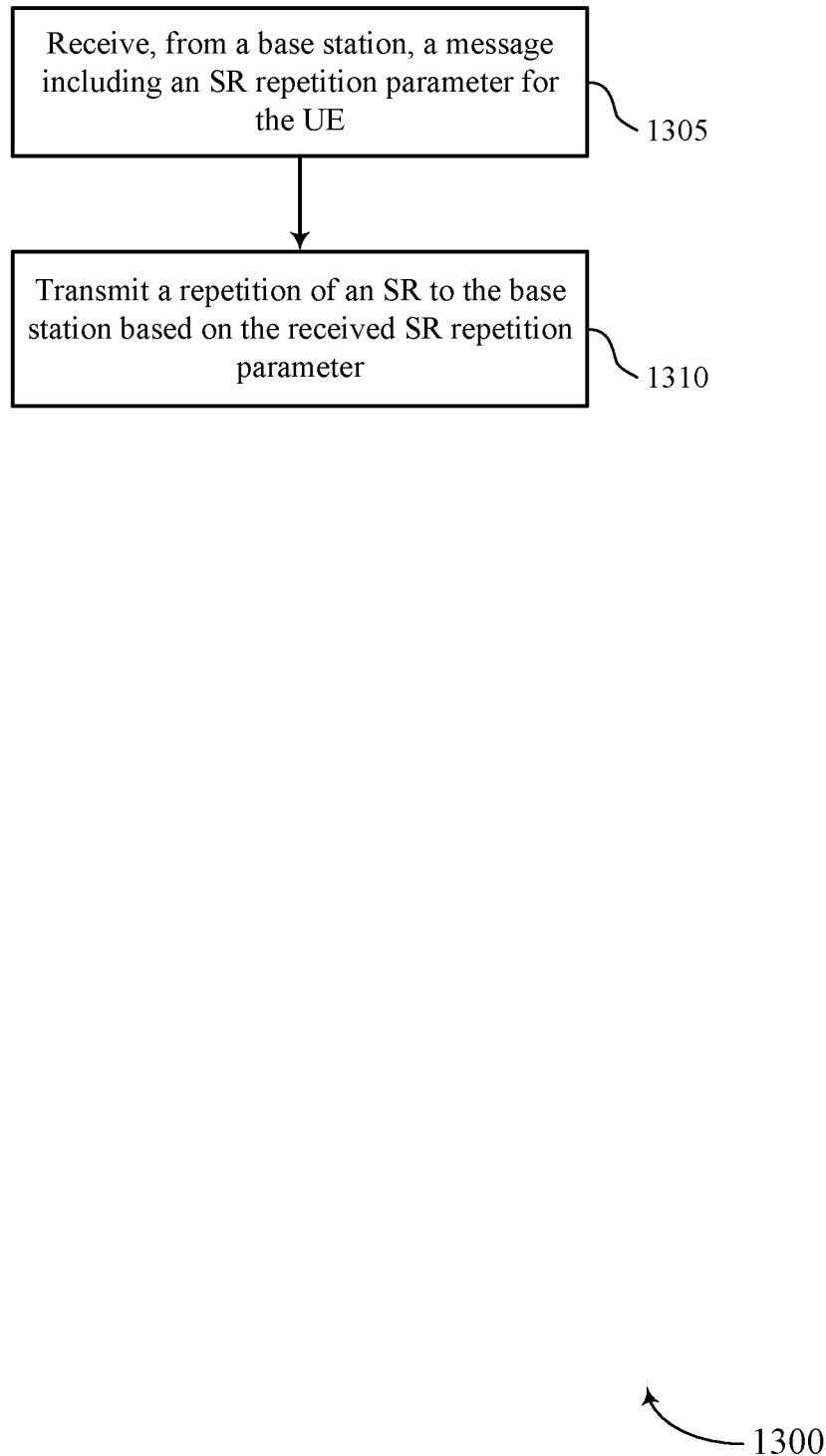
FIGS. 13 through 18 illustrate methods for UE-specific SR repetitions (e.g., retransmissions) in accordance with aspects of the present disclosure.

FIG. 13 shows a flowchart illustrating a method 1300 for UE-specific SR repetitions (e.g., retransmissions) in accordance with aspects of the present disclosure. The operations of method 1300 may be implemented by a UE 115 or its components as described herein. For example, the operations of method 1300 may be performed by a UE SR repetition manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive, from a base station, a message comprising an SR repetition parameter for the UE. The SR repetition parameter may be UE-specific and based at least in part on one or more of traffic priority for the UE, a UE link budget, a traffic latency requirement, or historical SR performance. The operations of block 1305 may be performed according to the methods described herein. In certain examples, aspects of the operations of block 1305 may be performed by an SR repetition parameter component as described with reference to FIGS. 5 through 8.

At block 1310 the UE 115 may transmit a repetition of an SR to the base station based on the received SR repetition parameter. The operations of block 1310 may be performed according to the methods described herein. In certain examples, aspects of the operations of block 1310 may be performed by an SR transmitting component as described with reference to FIGS. 5 through 8.

Figure 14:
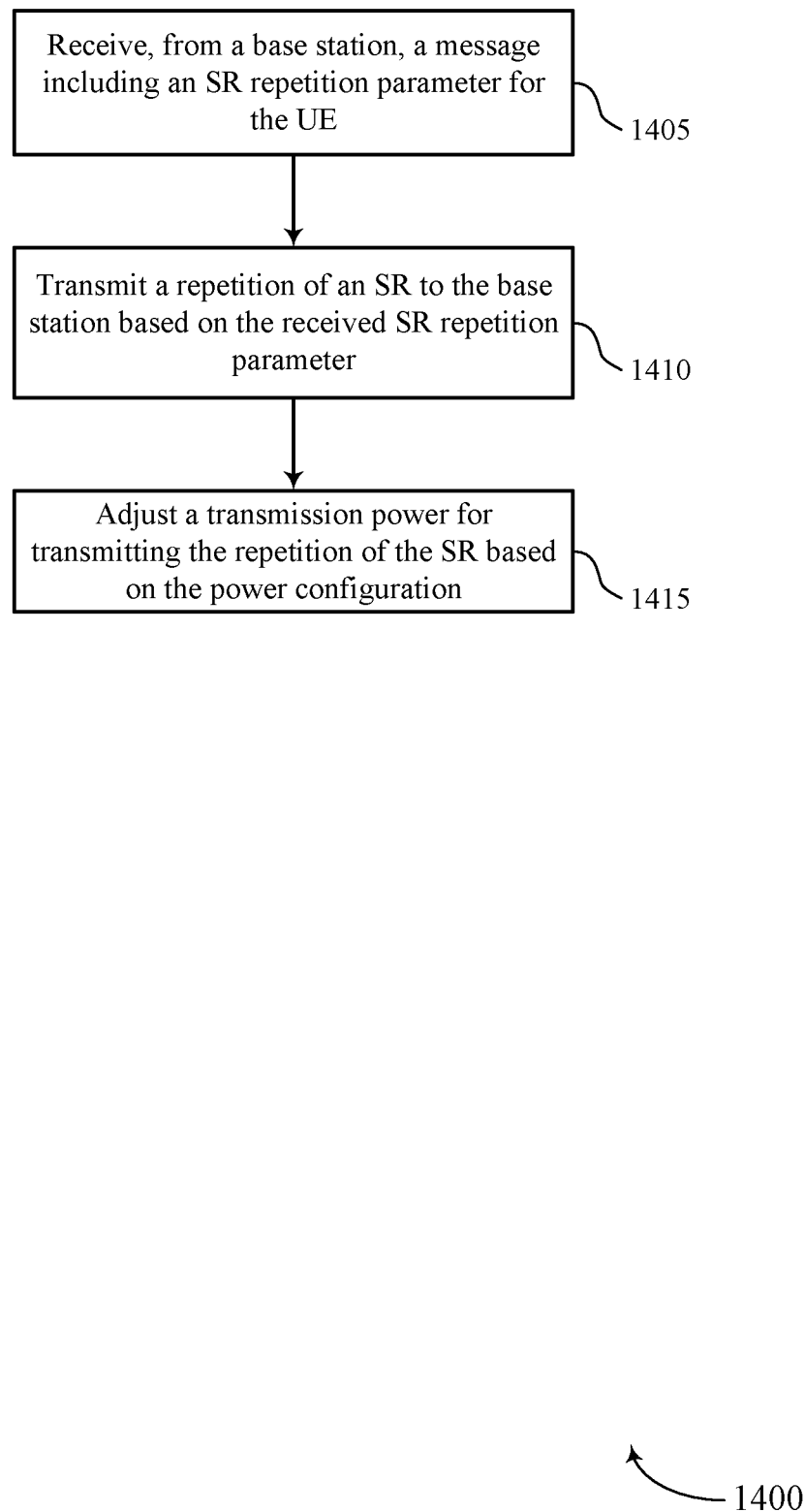

FIG. 14 shows a flowchart illustrating a method 1400 for UE-specific SR repetitions (e.g., retransmissions) in accordance with aspects of the present disclosure. The operations of method 1400 may be implemented by a UE 115 or its components as described herein. For example, the operations of method 1400 may be performed by a UE SR repetition manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, from a base station, a message comprising an SR repetition parameter for the UE. The SR repetition parameter may be UE-specific and based at least in part on one or more of traffic priority for the UE, a UE link budget, a traffic latency requirement, or historical SR performance. The operations of block 1405 may be performed according to the methods described herein. In certain examples, aspects of the operations of block 1405 may be performed by an SR repetition parameter component as described with reference to FIGS. 5 through 8.

At block 1410 the UE 115 may transmit a repetition of an SR to the base station based on the received SR repetition parameter. The operations of block 1410 may be performed according to the methods described herein. In certain examples, aspects of the operations of block 1410 may be performed by an SR transmitting component as described with reference to FIGS. 5 through 8.

At block 1415 the UE 115 may adjust a transmission power for transmitting the repetition of the SR based on the power configuration. The operations of block 1415 may be performed according to the methods described herein. In certain examples, aspects of the operations of block 1415 may be performed by an SR power configuration component as described with reference to FIGS. 5 through 8.

Figure 15:
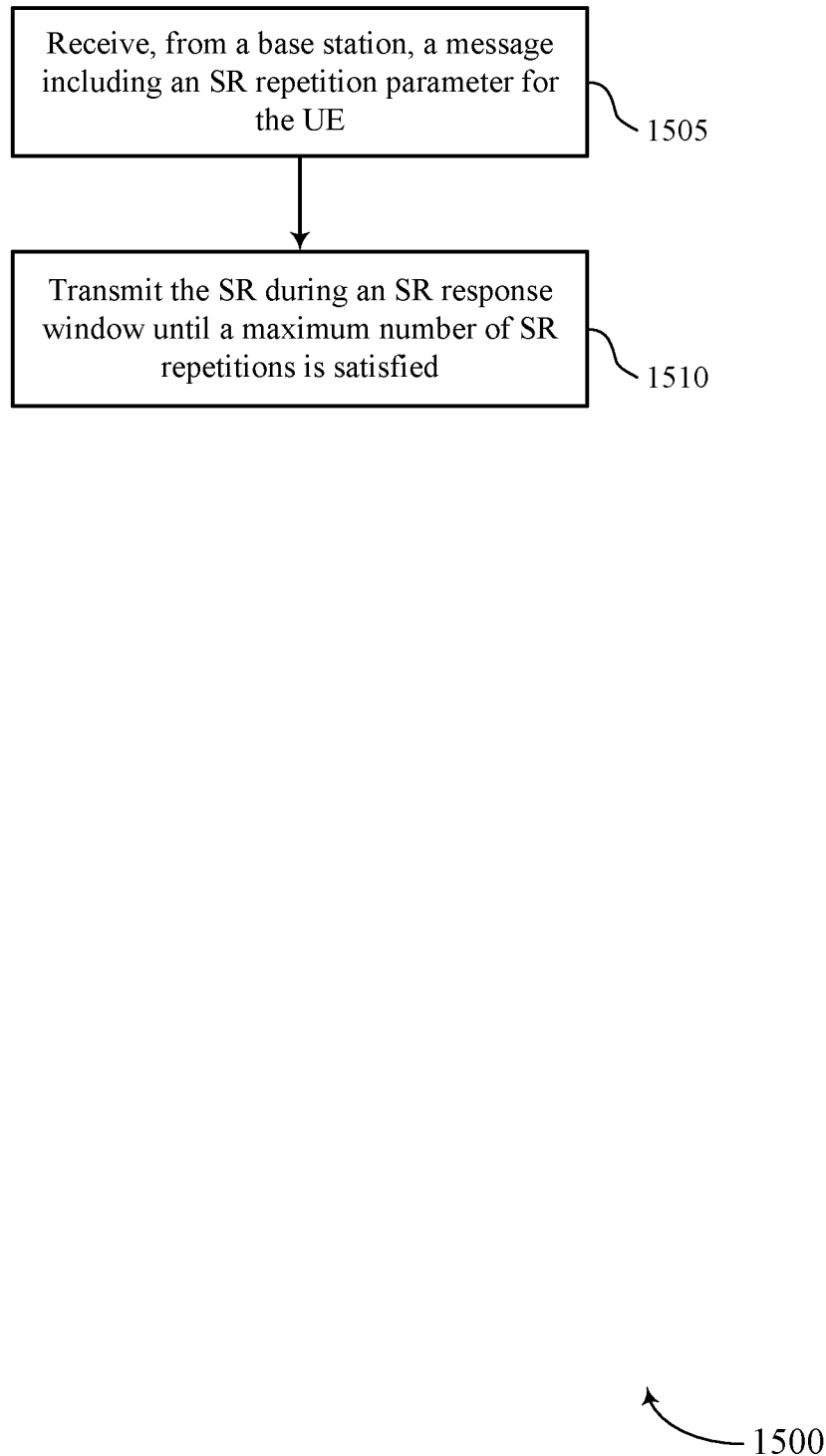

FIG. 15 shows a flowchart illustrating a method 1500 for UE-specific SR repetitions (e.g., retransmissions) in accordance with aspects of the present disclosure. The operations of method 1500 may be implemented by a UE 115 or its components as described herein. For example, the operations of method 1500 may be performed by a UE SR repetition manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, from a base station, a message comprising an SR repetition parameter for the UE. The SR repetition parameter may be UE-specific and based at least in part on one or more of traffic priority for the UE, a UE link budget, a traffic latency requirement, or historical SR performance. The operations of block 1505 may be performed according to the methods described herein. In certain examples, aspects of the operations of block 1505 may be performed by an SR repetition parameter component as described with reference to FIGS. 5 through 8.

At block 1510 the UE 115 may transmit a repetition of an SR to the base station based on the received SR repetition parameter. The operations of block 1510 may be performed according to the methods described herein. In certain examples, aspects of the operations of block 1510 may be performed by an SR transmitting component as described with reference to FIGS. 5 through 8.

In some cases, transmitting the repetition of the SR includes transmitting the SR during an SR response window until a maximum number of SR repetitions is satisfied.

Figure 16:
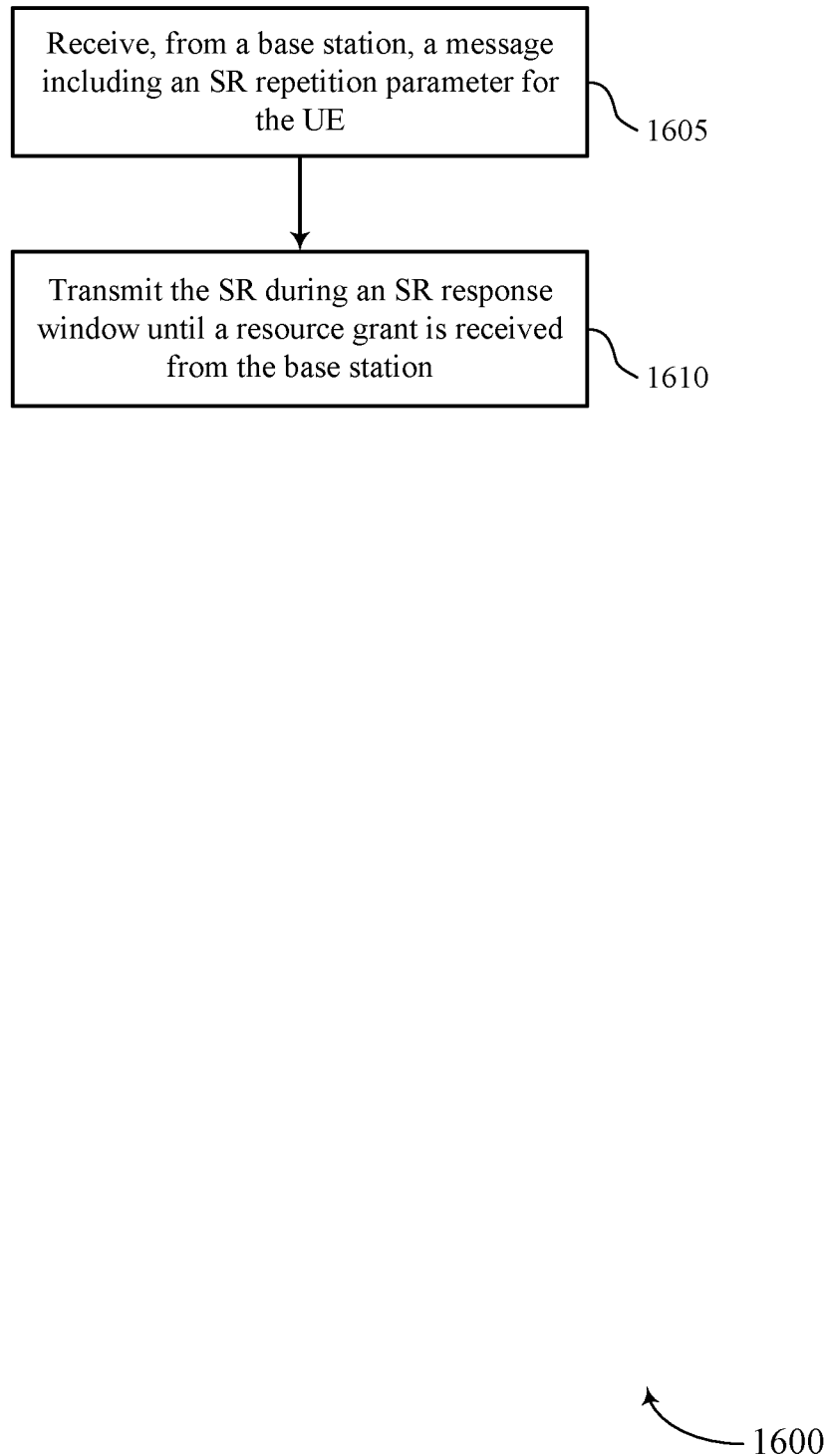

FIG. 16 shows a flowchart illustrating a method 1600 for UE-specific SR repetitions (e.g., retransmissions) in accordance with aspects of the present disclosure. The operations of method 1600 may be implemented by a UE 115 or its components as described herein. For example, the operations of method 1600 may be performed by a UE SR repetition manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station, a message comprising an SR repetition parameter for the UE. The SR repetition parameter may be UE-specific and based at least in part on one or more of traffic priority for the UE, a UE link budget, a traffic latency requirement, or historical SR performance. The operations of block 1605 may be performed according to the methods described herein. In certain examples, aspects of the operations of block 1605 may be performed by an SR repetition parameter component as described with reference to FIGS. 5 through 8.

At block 1610 the UE 115 may transmit a repetition of an SR to the base station based on the received SR repetition parameter. In some cases, transmitting the repetition of the SR includes transmitting the SR during an SR response window until a resource grant is received from the base station. The operations of block 1610 may be performed according to the methods described herein. In certain examples, aspects of the operations of block 1610 may be performed by an SR transmitting component as described with reference to FIGS. 5 through 8.

Figure 17:
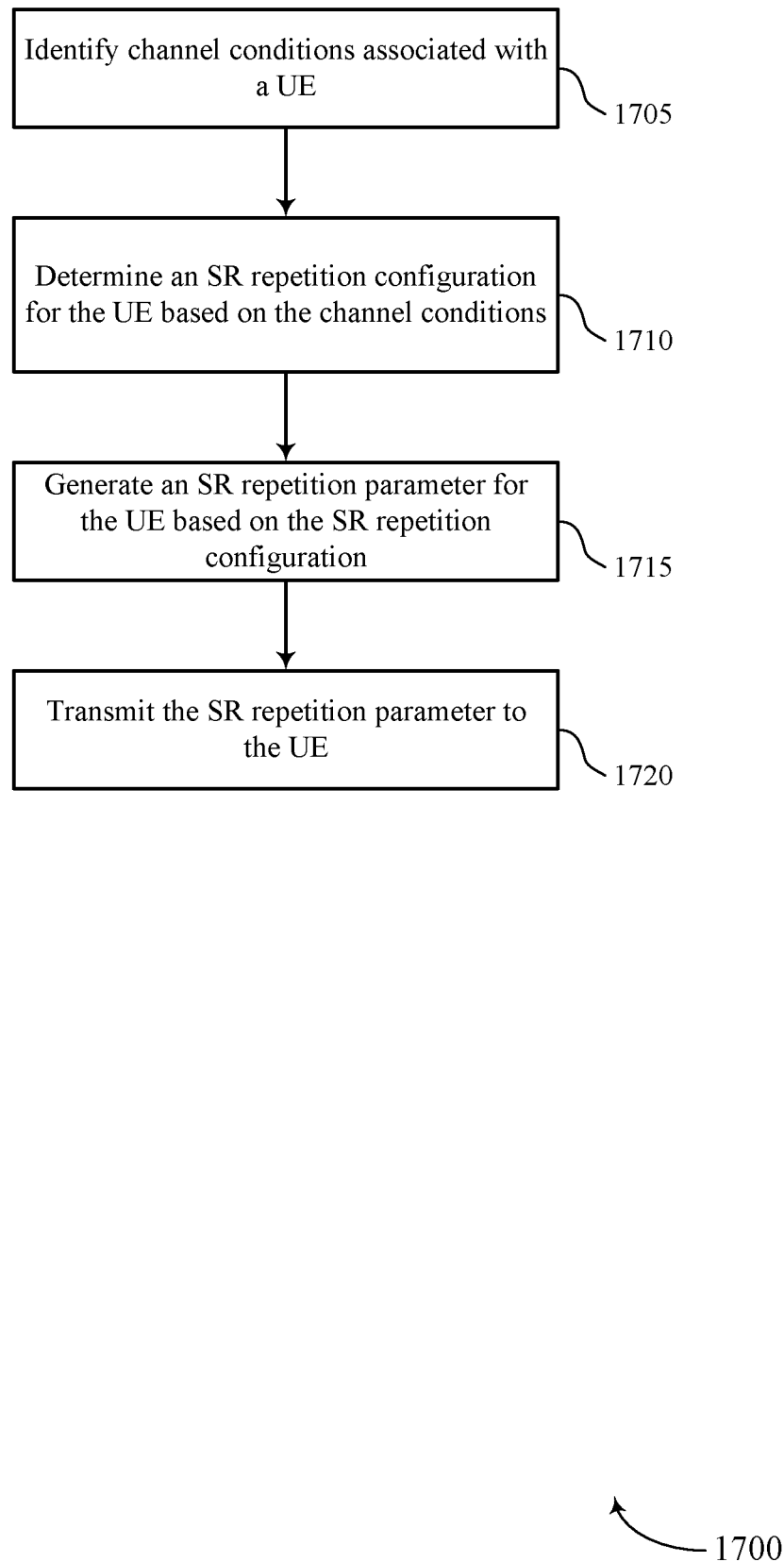

FIG. 17 shows a flowchart illustrating a method 1700 for UE-specific SR repetitions (e.g., retransmissions) in accordance with aspects of the present disclosure. The operations of method 1700 may be implemented by a base station 105 or its components as described herein. For example, the operations of method 1700 may be performed by a base station SR repetition manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify channel conditions associated with a UE. The operations of block 1705 may be performed according to the methods described herein. In certain examples, aspects of the operations of block 1705 may be performed by a channel conditions component as described with reference to FIGS. 9 through 12.

At block 1710 the base station 105 may determine an SR repetition configuration for the UE based on the channel conditions. The SR repetition configuration may be UE-specific and also based at least in part on one or more of traffic priority for the UE, a UE link budget, a traffic latency requirement, or historical SR performance. The operations of block 1710 may be performed according to the methods described herein. In certain examples, aspects of the operations of block 1710 may be performed by an SR repetition configuration component as described with reference to FIGS. 9 through 12.

At block 1715 the base station 105 may generate an SR repetition parameter for the UE based on the SR repetition configuration. The operations of block 1715 may be performed according to the methods described herein. In certain examples, aspects of the operations of block 1715 may be performed by a repetition parameter component as described with reference to FIGS. 9 through 12.

At block 1720 the base station 105 may transmit the SR repetition parameter to the UE. The operations of block 1720 may be performed according to the methods described herein. In certain examples, aspects of the operations of block 1720 may be performed by a repetition parameter component as described with reference to FIGS. 9 through 12.

Figure 18:
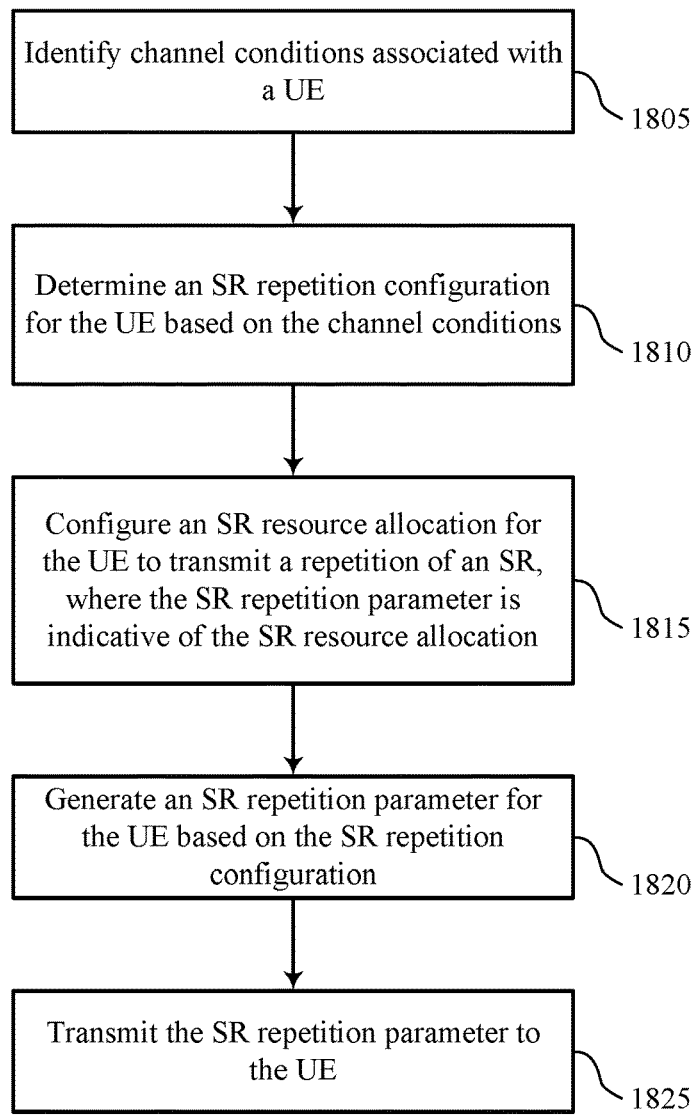

FIG. 18 shows a flowchart illustrating a method 1800 for UE-specific SR repetitions (e.g., retransmissions) in accordance with aspects of the present disclosure. The operations of method 1800 may be implemented by a base station 105 or its components as described herein. For example, the operations of method 1800 may be performed by a base station SR repetition manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify channel conditions associated with a UE. The operations of block 1805 may be performed according to the methods described herein. In certain examples, aspects of the operations of block 1805 may be performed by a channel conditions component as described with reference to FIGS. 9 through 12.

At block 1810 the base station 105 may determine an SR repetition configuration for the UE based on the channel conditions. The SR repetition configuration may be UE-specific and also based at least in part on one or more of traffic priority for the UE, a UE link budget, a traffic latency requirement, or historical SR performance. The operations of block 1810 may be performed according to the methods described herein. In certain examples, aspects of the operations of block 1810 may be performed by an SR repetition configuration component as described with reference to FIGS. 9 through 12.

At block 1815 the base station 105 may configure an SR resource allocation for the UE to transmit a repetition of an SR, where the SR repetition parameter is indicative of the SR resource allocation. The operations of block 1815 may be performed according to the methods described herein. In certain examples, aspects of the operations of block 1815 may be performed by a resource allocation configuration component as described with reference to FIGS. 9 through 12.

At block 1820 the base station 105 may generate an SR repetition parameter for the UE based on the SR repetition configuration. The operations of block 1820 may be performed according to the methods described herein. In certain examples, aspects of the operations of block 1820 may be performed by a repetition parameter component as described with reference to FIGS. 9 through 12.

At block 1825 the base station 105 may transmit the SR repetition parameter to the UE. The operations of block 1825 may be performed according to the methods described herein. In certain examples, aspects of the operations of block 1825 may be performed by a repetition parameter component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, a parameter or parameters of a plurality of scheduling request (SR) transmission, the parameter or parameters indicating a starting symbol to begin transmitting the plurality of SR transmissions; and
    transmitting one of the plurality of SR transmissions to the base station based at least in part on the starting symbol.

2. The method of claim 1, the parameter or parameters indicating a number of the plurality of SR transmissions.

3. The method of claim 1, the parameter or parameters indicating an SR transmission periodicity.

4. The method of claim 3, the starting symbol being based at least in part on the SR transmission periodicity.

5. The method of claim 3, the transmission periodicity being two symbols.

6. The method of claim 1, the parameter or parameters comprising an index of an SR configuration for the UE.

7. The method of claim 1, wherein the parameter or parameters indicating of a power configuration for the plurality of SR transmissions, the method further comprising:
    adjusting a transmission power for transmitting the plurality of SR transmissions, based on the power configuration.

8. The method of claim 7, wherein adjusting the transmission power for transmitting the plurality of SR transmissions comprises:
    increasing the transmission power for the plurality of SR transmissions in symbol periods known by the UE to have a channel condition that satisfies a threshold.

9. The method of claim 7, the parameter or parameters indicating the transmission power for transmitting the plurality of SR transmissions based at least in part on an SR repetition number.

10. The method of claim 1, wherein the parameter or parameters are indicative of an SR resource allocation, wherein the plurality of SR transmissions is transmitted on a set of time-frequency resources in accordance with the SR resource allocation.

11. The method of claim 10, wherein the SR resource allocation is indicative of transmitting the plurality of SR transmissions using a hopping pattern, or a same symbol period, or multiple symbol periods, or cyclic shifts in a single resource block, different radio frequency bands, or any combination thereof.

12. The method of claim 1, wherein transmitting the plurality of SR transmissions comprises:
    transmitting the plurality of SR transmissions during an SR response window until a number of SR transmissions is satisfied.

13. The method of claim 1, wherein transmitting the plurality of SR transmissions comprises:
    transmitting the plurality of SR transmissions during an SR response window until a resource grant is received from the base station.

14. The method of claim 1, wherein transmitting the plurality of SR transmissions comprises:
    transmitting the plurality of SR transmissions in multiple slots or subframes.

15. The method of claim 1, further comprising:
    identifying a collision between a transmission of a feedback message and the plurality of SR transmissions;
    determining a priority of the feedback message and a priority of plurality of SR transmissions; and
    transmitting the feedback message, or the plurality of SR transmissions, or both, based at least in part on the priority of the feedback message and the priority of the plurality of SR transmissions.

16. The method of claim 1, the plurality of SR transmissions being SR repeating transmissions.

17. The method of claim 16, the parameter or parameters indicating the SR repeating transmission across a slot boundary.

18. The method of claim 16, the parameter or parameters further indicating a frequency hopping pattern.

19. The method of claim 1, the one of the plurality of SR transmissions comprising multiplexing the one of the plurality of SR transmissions with an acknowledgement or negative acknowledgment (ACK/NACK) feedback.

20. A method for wireless communication at a base station, comprising:
    generating a parameter or parameters of a plurality of scheduling request (SR) transmissions for a UE, the parameter or parameters indicating a starting symbol of the plurality of SR transmissions; and
    transmitting the parameter or parameters to the UE.

21. The method of claim 20, the parameter or parameters indicating a number of the plurality of SR transmissions.

22. The method of claim 20, the parameter or parameters is indicating an SR transmission periodicity.

23. The method of claim 22, the starting symbol being based at least in part on the SR transmission periodicity.

24. The method of claim 20, wherein the parameter or parameter indicating a power configuration, the method further comprising:
    adjusting a transmission power for transmitting the plurality of SR transmissions, based on the power configuration.

25. The method of claim 20, further comprising:
    configuring an SR resource allocation for the UE to transmit one of the plurality of SR transmissions, the parameter or parameters indicating the SR resource allocation.

26. An apparatus for wireless communication, comprising:
    a memory;
    a processor coupled to the memory and configured to:

receive, from a base station, a parameter or parameters of a plurality of scheduling request (SR) transmission, the parameter or parameters indicating a starting symbol to begin transmitting the plurality of SR transmissions; and transmit one of the plurality of SR transmissions to the base station based at least in part on the starting symbol.

27. The apparatus of claim 26, the parameter or parameters indicating a number of the plurality of SR transmissions.

28. The apparatus of claim 26, the parameter or parameters indicating an SR transmission periodicity.

29. The apparatus of claim 28, the starting symbol being based at least in part on the SR transmission periodicity.

30. The apparatus of claim 26, wherein the parameter or parameters comprises an index of the SR configuration for the UE.

31. The apparatus of claim 26, wherein the parameter or parameters indicating a power configuration for the plurality of SR transmissions,
the processor being further configured to:
adjust a transmission power for transmitting the plurality of SR transmissions, based on the power configuration.

32. The apparatus of claim 31, the processor being configured to:
adjust the transmission power for transmitting the plurality of SR transmissions comprising increasing the transmission power for the plurality of SR transmissions in symbol periods known by the UE to have a channel condition that satisfies a threshold.

33. The apparatus of claim 31, wherein the parameter parameters indicating the transmission power for transmitting the plurality of SR transmissions based at least in part on an SR number.

34. The apparatus of claim 26, wherein the parameter parameters indicating an SR resource allocation, wherein the plurality of SR transmissions is transmitted on a set of time-frequency resources in accordance with the SR resource allocation.

35. The apparatus of claim 34, wherein the SR resource allocation is indicative of transmitting the plurality of SR transmissions using a hopping pattern, or a same symbol period, or multiple symbol periods, or cyclic shifts in a single resource block, different radio frequency bands, or any combination thereof.

36. The apparatus of claim 26, the processor being further configured to:
transmit the plurality of SR transmissions during an SR response window until a number of SR transmissions is satisfied.

37. The apparatus of claim 26, the processor being further configured to:
transmit the plurality of SR transmissions during an SR response window until a resource grant is received from the base station.

38. The apparatus of claim 26, the processor being further configured to:
transmit the plurality of SR transmissions in multiple slots or subframes.

39. The apparatus of claim 26, the processor being further configured to:
identify a collision between a transmission of a feedback message and the plurality of SR transmissions;
determine a priority of the feedback message and a priority of the plurality of SR transmissions; and transmit the feedback message, or the plurality of SR transmissions, or both, based at least in part on the priority of the feedback message and the priority of the plurality of SR transmissions.

40. The apparatus of claim 26, the plurality of SR transmissions being SR repeating transmissions.

41. The apparatus of claim 40, the parameter or parameters indicating the SR repeating transmission across a slot boundary.

42. The apparatus of claim 40, the parameter or parameters further indicating frequency hopping pattern for the SR repeating transmissions.

43. The apparatus of claim 26, the one of the plurality of SR transmissions comprising multiplexing the one of the plurality of SR transmissions with an acknowledgement or negative acknowledgment (ACK/NACK) feedback.

44. An apparatus for wireless communication, comprising:
a memory;
a processor coupled to the memory and configured to:
generate a parameter or parameters of a plurality of scheduling request (SR) transmissions for a UE, the parameter or parameters indicating a starting symbol of the plurality of SR transmissions; and
transmit the parameter or parameters to the UE.

45. The apparatus of claim 44, the parameter or parameters indicating a number of the plurality of SR transmissions.

46. The apparatus of claim 44, the parameter or parameters indicating the SR transmission periodicity.

47. The apparatus of claim 46, the starting symbol being based at least in part on the SR transmission periodicity.

48. The apparatus of claim 44, the parameter or parameters indicating a power configuration, the processor being further configured to adjust a transmission power for transmitting the plurality of SR transmissions, based on the power configuration.

49. The apparatus of claim 44, the processor being further configured to:
configure an SR resource allocation for the UE to transmit one of the plurality of SR transmissions, wherein the parameter is indicative of the SR resource allocation.

50. The apparatus of claim 44, the plurality of SR transmissions being SR repeating transmissions.

51. The apparatus of claim 50, the parameter or parameters indicating the SR repeating transmission across a slot boundary.

52. The apparatus of claim 50, the parameter or parameters further indicating a frequency hopping pattern for the SR repeating transmissions.

53. The method of claim 16, further comprising:
dropping an ACK/NACK feedback or an SR repetition of the SR repeating transmissions based on priorities of the ACK/NACK feedback and the SR repetition, the SR repetition being to be in a collision with the ACK/NACK feedback.

54. The apparatus of claim 40, the processor being further configured to:
drop an ACK/NACK feedback or an SR repetition of the SR repeating transmissions based on priorities of the ACK/NACK feedback and the SR repetition, the SR repetition being to be in a collision with the ACK/NACK feedback.

55. The apparatus of claim 50, the processor being further configured to:
receive an ACK/NACK feedback or an SR repetition of the SR repeating transmission based one of the ACK/

NACK feedback or the SR repetition being dropped based on priorities of the ACK/NACK feedback and the SR repetition, the SR repetition being to be in a collision with the ACK/NACK feedback.

* * * * *